United States Patent
Neumayr et al.

(10) Patent No.: US 10,177,681 B2
(45) Date of Patent: Jan. 8, 2019

(54) POWER CONVERTER INCLUDING AN AUTOTRANSFORMER AND POWER CONVERSION METHOD

(71) Applicant: Infineon Technologies Austria AG, Villach (AT)

(72) Inventors: Dominik Neumayr, Zurich (CH); Dominik Bortis, Zurich (CH); Mattia Guacci, Zurich (CH); Johann Kolar, Zurich (CH); Michael Leibl, Zurich (CH); Gerald Deboy, Klagenfurt (AT)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/192,449

(22) Filed: Jun. 24, 2016

(65) Prior Publication Data

US 2017/0373608 A1     Dec. 28, 2017

(51) Int. Cl.
    *H02M 7/48*         (2007.01)
    *H02M 1/00*         (2006.01)
    *H02M 3/335*       (2006.01)

(52) U.S. Cl.
    CPC ...... *H02M 7/4826* (2013.01); *H02M 3/33569* (2013.01); *H02M 2001/0058* (2013.01); *H02M 2007/4818* (2013.01); *Y02B 70/1425* (2013.01); *Y02B 70/1441* (2013.01)

(58) Field of Classification Search
    CPC ......... H02M 2001/0058; H02M 3/158; H02M 3/33569; H02M 7/04; H02M 7/4826; H02M 2007/4818; Y02B 70/1425; Y02B 70/1433; Y02B 70/1491; Y02B 70/1441
See application file for complete search history.

(56) References Cited

U.S. PATENT DOCUMENTS

| | | | | |
|---|---|---|---|---|
| 5,625,539 A | * | 4/1997 | Nakata | H02M 7/4807 363/132 |
| 6,078,146 A | * | 6/2000 | Reverberi | H05B 41/40 315/137 |

(Continued)

OTHER PUBLICATIONS

Grant, Duncan Andrew et al., "Synthesis of Tapped-Inductor Switched-Mode Converters", IEEE Transactions on Power Electronics, vol. 22, No. 5, Sep. 2007, pp. 1964-1969.

(Continued)

*Primary Examiner* — Fred E Finch, III
*Assistant Examiner* — Demetries A Gibson
(74) *Attorney, Agent, or Firm* — Murphy, Bilak & Homiller, PLLC

(57) ABSTRACT

A power converter circuit includes a chopper circuit configured to receive an input voltage and generate a chopper voltage with an alternating voltage level based on the input voltage, an autotransformer including at least one tap, the autotransformer being coupled to the chopper circuit and configured to generate a tap voltage at the at least one tap, and a selector circuit configured to receive a plurality of voltage levels. At least one of these the voltage levels is based on the at least one tap voltage. The selector circuit is further configured to generate a selector output voltage based on the plurality of voltage levels such that the selector circuit selects two of the plurality of voltage levels and switches at a switching frequency between the two voltage levels.

23 Claims, 14 Drawing Sheets

(56) References Cited

U.S. PATENT DOCUMENTS

| | | | | |
|---|---|---|---|---|
| 6,153,863 | A * | 11/2000 | Snowball | H05B 6/062 |
| | | | | 219/626 |
| 8,723,365 | B2 * | 5/2014 | Bordry | H02J 7/345 |
| | | | | 307/77 |
| 8,730,700 | B2 * | 5/2014 | Yuzurihara | H02M 7/48 |
| | | | | 363/132 |
| 8,836,228 | B2 | 9/2014 | Xu et al. | |
| 9,343,994 | B2 * | 5/2016 | Hosokawa | H01F 30/04 |
| 2010/0220501 | A1 * | 9/2010 | Krause | H02M 3/33584 |
| | | | | 363/17 |
| 2012/0287678 | A1 * | 11/2012 | Xu | H02M 3/158 |
| | | | | 363/17 |

OTHER PUBLICATIONS

Gu, Yilei et al., "Voltage Doubler Application in Isolated Resonant Converters", 31st Annual Conference of IEEE Industrial Electronics Society, Nov. 2005, IECON 2005, pp. 1184-1188.

Hesterman, Bryce, "Analysis and Modeling of Magnetic Coupling", Denver Chapter, IEEE Power Electronics Society, University of Colorado, Boulder, Colorado, Apr. 10, 2007, pp. 1-93.

Jung, Jee-Hoon et al., "High Efficiency Bidirectional LLC Resonant Converter for 380V DC Power Distribution System Using Digital Control Scherne", 2012 Twenty-Seventh Annual IEEE Applied Power Electronics Conference and Exposition (APEC), Orlando, FL, Feb. 2012, pp. 532-538.

\* cited by examiner

POWER CONVERTER INCLUDING AN AUTOTRANSFORMER AND POWER CONVERSION METHOD

TECHNICAL FIELD

This disclosure in general relates to a power converter and a power conversion method.

BACKGROUND

Power conversion is an important issue in today's power supply systems. DC/AC power conversion is one type of power conversion which involves converting DC power into AC power. The DC power is provided by a DC power source such as, for example, photovoltaic (PV) panels, batteries or the like. The AC power may be fed into a power grid or used to drive a motor, to name only two examples.

An important aspect in every type of power conversion is to efficiently convert the power, that is, to keep losses that may occur in connection with the power conversion as low as possible.

SUMMARY

One example relates to a power converter circuit. The power converter circuit includes a chopper circuit configured to receive an input voltage and generate a chopper voltage with an alternating voltage level based on the input voltage, an autotransformer with at least one tap, wherein the autotransformer is coupled to the chopper circuit and configured to generate a tap voltage at the at least one tap, and a selector circuit configured to receive a plurality of voltage levels. At least one of the voltage levels is based on the at least one tap voltage, and the selector circuit is configured to generate a selector output voltage based on the plurality of voltage levels such that the selector circuit selects two of the plurality of voltage levels and switches at a switching frequency between the two voltage levels.

One example relates to a method. The method includes receiving an input voltage and generating a chopper voltage with an alternating voltage level based on the input voltage by a chopper circuit, generating a tap voltage at the at least one tap by an autotransformer coupled to the chopper circuit, receiving a plurality of voltage levels by a selector circuit, wherein at least one of the voltage levels is based on the at least one tap voltage, and generating a selector output voltage based on the plurality of voltage levels by the selector circuit such that a voltage level of the selector output voltage alternates at a switching frequency between two selected ones of the plurality of voltage levels.

Another example relates to a power converter circuit. The power converter circuit includes a chopper circuit configured to receive an input voltage and generate a chopper voltage with an alternating voltage level based on the input voltage and with a chopper frequency, an autotransformer comprising at least one tap, wherein the autotransformer is coupled to the chopper circuit and configured to generate a tap voltage at the at least one tap, and a selector circuit configured to receive a plurality of voltage levels, wherein at least one of the voltage levels is based on the at least one tap voltage. The selector circuit is configured to generate a selector output voltage based on the plurality of voltage levels. The power converter circuit includes at least one series resonant circuit excited by the chopper voltage, wherein parameters of the at least one series resonant circuit are adapted to the chopper frequency such that the chopper frequency substantially equals a resonant frequency of the at least one series resonant circuit.

Yet another example relates to a method. The method includes receiving an input voltage and generating a chopper voltage with an alternating voltage level based on the input voltage and with a chopper frequency by a chopper circuit, receiving the chopper voltage and generating at least one tap voltage based on the chopper voltage by an autotransformer, and receiving a plurality of voltage levels by a selector circuit, wherein at least one of the voltage levels is based on the at least one tap voltage, and generating a selector output voltage based on the plurality of voltage levels by the selector circuit. The chopper frequency substantially equals a resonant frequency of at least one series resonant circuit that includes a parasitic inductance of the autotransformer.

Those skilled in the art will recognize additional features and advantages upon reading the following detailed description, and upon viewing the accompanying drawings.

BRIEF DESCRIPTION OF THE DRAWINGS

Examples are explained below with reference to the drawings. The drawings serve to illustrate certain principles, so that only aspects necessary for understanding these principles are illustrated. The drawings are not to scale. In the drawings the same reference characters denote like features.

FIGS. 12-14B show timing diagrams of signals occurring in the power converter circuit shown in FIG. 10;

DETAILED DESCRIPTION

In the following detailed description, reference is made to the accompanying drawings. The drawings form a part of the description and by way of illustration show specific embodiments in which the invention may be practiced. It is to be understood that the features of the various embodiments described herein may be combined with each other, unless specifically noted otherwise.

Figure 1:
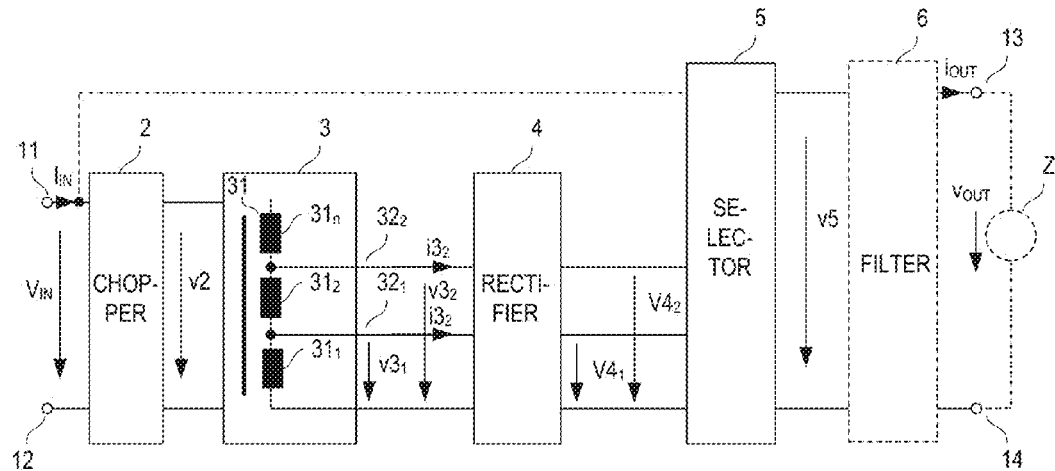
FIG. 1 shows one example of a power converter circuit that includes a chopper circuit, an autotransformer circuit, a rectifier circuit, and a selector circuit.

FIG. 1 shows one example of a power converter circuit configured to convert an input power $P_{IN}$ received at an input 11, 12 into an output power pour provided at an output 13, 14. The input power $P_{IN}$ is defined as the product of an input current $I_{IN}$ received at the input 11, 12 and an input voltage $V_{IN}$ between a first input node 11 and a second input node 12 of the input, so that $P_{IN}=V_{IN} \cdot I_{IN}$. The output power pour is defined as the product of an output current $i_{OUT}$ provided at the output 13, 14 and an output voltage $v_{OUT}$ between a first output node 13 and a second output node 14 of the output, so that $p_{OUT}=v_{OUT} \cdot i_{OUT}$. A load Z (illustrated in dashed lines in FIG. 1) may receive the output power pour supplied by the power converter circuit.

According to one example, the input power $P_{IN}$ is a DC (Direct Current) power, that is, the input voltage $V_{IN}$ is a direct voltage and the input current $I_{IN}$ is a direct current. According to one example, the power converter circuit is configured to convert the DC power received at the input 11, 12 into an AC (Alternating Current) power at the output 13, 14, so that the output current $i_{OUT}$ is an alternating current and the output voltage $v_{OUT}$ is an alternating voltage. According to one example, the load Z is a power grid. In this example, the waveform of the output voltage $v_{OUT}$ is defined by the load Z and the power converter circuit may generate the output current $i_{OUT}$ to be in phase with or to have a predefined phase difference relative to the output voltage $v_{OUT}$. According to another example, the load Z is a motor that is driven by the output power pour. In this case, the power converter circuit defines the waveform of the output voltage $v_{OUT}$. The DC power received at the input 11, 12 may be provided by a conventional DC power source (not shown in the drawings) such as a photovoltaic (PV) panel, a battery arrangement, a fuel cell arrangement, or the like.

In the following, capital letters such as V and I are used to denote direct currents, direct voltages and average levels (mean levels) of alternating currents and voltages, respectively. Lowercase letters such as v and i are used to denote alternating voltages and alternating currents.

Referring to FIG. 1, the power converter circuit includes a chopper circuit 2. The chopper circuit is configured to receive the input voltage $V_{IN}$ and generate based on the input voltage $V_{IN}$ a chopper voltage v2 with an alternating varying signal level. An autotransformer circuit 3 that includes an autotransformer 31 receives the chopper voltage v2 and is configured to generate at least one tap voltage $v3_1$, $v3_2$ based on the chopper voltage v2. Examples of how the autotransformer circuit 3 may generate the at least one tap voltage $v3_1$, $v3_2$ from the chopper voltage v2 are explained in greater detail herein below. A rectifier circuit 4 receives the at least one tap voltage $v3_1$, $v3_2$ from the autotransformer circuit 3 and is configured to generate at least one intermediate voltage $V4_1$, $V4_2$ from the at least one tap voltage $v3_1$, $v3_2$. The at least one intermediate voltage $V4_1$, $V4_2$ is also referred to as DC link voltage in the following.

According to one example, as shown in FIG. 1, the autotransformer circuit 31 provides a plurality of tap voltages $v3_1$, $v3_2$. Just for the purpose of illustration, the plurality of tap voltages $v3_1$, $v3_2$ includes two voltages $v3_1$, $v3_2$ in the example shown in FIG. 1, wherein each of these tap voltages $v3_1$, $v3_2$ is available at one tap $32_1$, $32_2$ of the autotransformer 32. This, however, is only an example, autotransformer circuit 3 can be implemented with an arbitrary number of taps, so that an arbitrary number of tap voltages a can be generated. Each tap $32_1$, $32_2$ of the autotransformer circuit 3 is a circuit node between two respective windings $31_1$, $31_2$, $31_n$ of the autotransformer 31. These windings $31_1$, $31_2$, $31_n$ are connected in series and inductively coupled. According to one example, each DC link voltage $V4_1$, $V4_2$ is generated from one tap voltage $v3_1$, $v3_2$ so that the number of tap voltages equals the number of DC link voltages $V4_1$, $V4_2$.

Referring to FIG. 1, a selector circuit 5 receives the at least one DC link voltage $V4_1$, $V4_2$ and generates a selector output voltage v5 based on the at least one DC link voltage $V4_1$, $V4_2$. Optionally, the selector circuit 5 further receives the input voltage $V_{IN}$ in order to generate the selector output voltage v5 based on the at least one DC link voltage $V4_1$, $V4_2$ and the input voltage $V_{IN}$. According to one example, the selector output voltage v5 is the output voltage $v_{OUT}$ of the power converter circuit. According to another example, the output voltage $v_{OUT}$ is generated from the selector output voltage v5 by a filter circuit 6 connected between the selector circuit 5 and the output 13, 14. According to yet another example, a series voltage regulator generates the output voltage $v_{OUT}$ based on the selector output voltage v5.

Figure 2A:
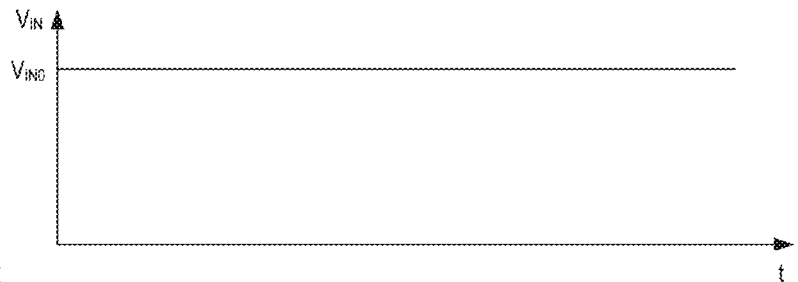
FIGS. 2A-2C show examples of timing diagrams of an input voltage, a chopper output voltage and a selector output voltage in the power converter circuit shown in FIG. 1.
Figure 2B:
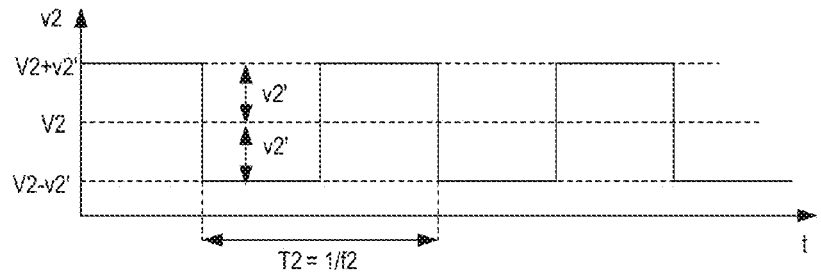
Figure 2C:
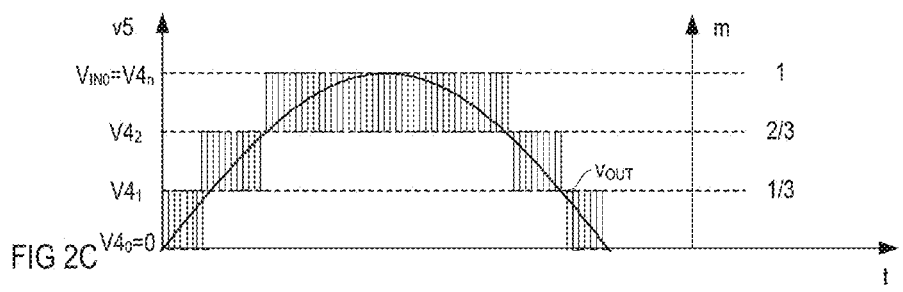

FIGS. 2A-2C show examples of timing diagrams of some of the signals that occur in a power converter circuit of the type shown in FIG. 1 during its operation. FIG. 2A shows a timing diagram of the input voltage $V_{IN}$, FIG. 2B shows a timing diagram of the chopper voltage v2, and FIG. 2C shows timing diagrams of the selector output voltage v5 and the output voltage $v_{OUT}$. In the example shown in FIG. 2A, the input voltage $V_{IN}$ is a direct voltage with a voltage level $V_{IN0}$. Referring to FIG. 2B, the chopper circuit 2 may generate the chopper voltage v2 to be a square-wave voltage based on the input voltage $V_{IN}$. According to one example, the chopper voltage v2 is a periodic voltage that periodically changes its signal level between V2+v2' and V2−v2', where V2 denotes a mean of the chopper voltage v2 and v2' denotes the amplitude. In FIG. 2B, T2 denotes one period of the chopper voltage v2 and f2=1/T2 denotes the frequency of the chopper voltage v2. In every period of the chopper voltage v2, there is a time period, when the chopper voltage v2 has the lower level V2−v2' and a time period, when the chopper voltage v2 has the higher level V2+v2'. According to one example, these time durations are equal, that is, the chopper voltage v2 has the low level V2−v2' 50% of the period T2, and the high level V2+v2' 50% of the time period T2.

The selector circuit 5 may generate the output voltage $v_{OUT}$. Alternatively, the selector circuit 5 generates a voltage based on which the optional filter 6 generates the output voltage your. FIG. 2C illustrates an example of how the selector circuit 5 may generate the selector output voltage based on two DC link voltages $V4_1$, $V4_2$ and the input voltage $V_{IN}$. FIG. 2C furthermore shows the waveform of an output voltage obtained by low-pass filtering the selector output voltage v5. In the example shown in FIG. 2C, the selector output voltage can have four different voltage levels which are selected from 0 (zero), the two tap voltages $V4_1$, $V4_2$, and the input voltage level $V_{IN0}$. Just for the purpose of explanation, the individual voltage levels are drawn such that $V4_1=\frac{1}{3} \cdot V_{IN0}$ and $V4_2=\frac{2}{3} \cdot V_{IN0}$. In this case, voltage differences between neighboring voltage levels are equal, namely $\frac{1}{3} \cdot V_{IN0}$. This, however, is only an example. The voltage levels of the DC link voltages $V4_1$, $V4_2$ could also be generated such that voltage differences between neighboring voltage levels are not equal.

The selector circuit 5 generates the selector output voltage v5 such that at each time a voltage level of the selector output voltage v5 equals one of the different voltage levels 0, $V4_1$, $V4_2$, $VIN_0$ the selector circuit 5 receives. Referring to the above, the output voltage $v_{OUT}$ may be generated from the selector output voltage v5 by low-pass filtering. If, for example, a desired (instantaneous) voltage level of the output voltage $v_{OUT}$ equals one of the voltage levels received by the selector circuit 5, the selector circuit 5 may simply pass through the respective voltage level to its output. If, however, a desired (instantaneous) voltage level of the Output voltage $v_{OUT}$ is between two neighboring (consecutive) voltage levels received by the selector circuit 5, the selector circuit may approximate the output voltage $v_{OUT}$ by switching between two neighboring DC voltage levels in accordance with a switching frequency. The output voltage $v_{OUT}$ is then the result of low-pass filtering the selector output voltage v5, wherein the low-pass filter may be implemented such that its cutoff frequency is below the switching frequency of the selector circuit 5, but higher than a maximum frequency of the output voltage $v_{OUT}$. In the example shown in FIG. 1, the output voltage is a sinusoidal voltage (or a rectified sinusoidal voltage), respectively, wherein only one half-period (or one period) is shown. The frequency of such sinusoidal voltage is much lower such as less than $\frac{1}{100}$, less than $\frac{1}{1000}$, or even less than $\frac{1}{10000}$ of the switching frequency of the selector circuit 5. In the example shown in FIG. 2C, the selector circuit 5 only switches between consecutive voltage levels. This, however, is only an example. The selector circuit 5 may also switch between voltage levels that are not consecutive. That is, for example, the selector circuit 5 may switch between 0 and voltage level $V4_2$ wherein 0 and $V4_2$ are not consecutive voltage levels as there is another voltage level, $V4_1$, between 0 and $V4_2$.

According to one example, the selector circuit 5 operates in accordance with a modulation index m. The modulation index m is defined by a ratio between an instantaneous voltage level of the output voltage $v_{OUT}$ and the maximum DC link voltage, wherein the input voltage $V_{IN}$ is also regarded as one of the DC link voltages in this example. In the example shown in FIG. 2C, the maximum DC link voltage is the input voltage $V_{IN0}$. In the example shown in FIG. 2C, the modulation index m=1 if the instantaneous voltage level of the output voltage $v_{OUT}$ equals the input voltage $V_{IN0}$, m=0, if the output voltage $v_{OUT}$ is zero and m=$\frac{1}{3}$ if $v_{OUT}=V4_1$, for example.

Referring to FIG. 2C, the DC link voltages $V4_1$, $V4_2$ and the input voltage $V_{IN}$ define a plurality of consecutive voltage levels, with each pair of consecutive voltage levels defining a voltage interval. In the example shown in FIG. 2C, these voltage intervals are between 0 and $V4_1$, between $V4_1$ and $V4_2$ and between $V4_2$ and $V_{IN}$. The selector output voltage v5 is generated such that the selector circuit 5 at a switching frequency f4 (which is explained below) switches between two of the voltage levels. According to one example, the selector circuit 5 is configured such that it only switches between voltage levels of one interval, wherein the choice of the interval is dependent on the desired voltage level of the output voltage. In the latter case, the maximum voltage swing at one time is given by the voltage defining one interval (only when the selector circuit 5 switches from a first interval to a second interval the swing may be higher, namely the sum of the voltages that define the first interval and the second interval. The "voltage defining an interval" is the voltage between the two voltage levels that define (border) the interval.

Figure 3A:
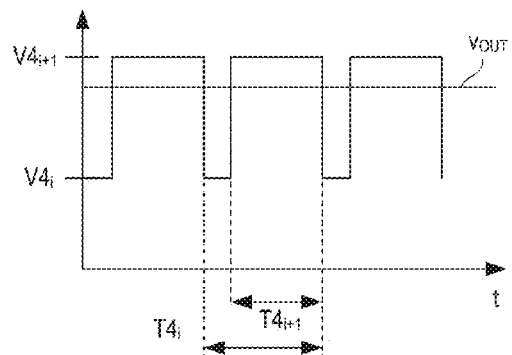
FIGS. 3A and 3B show examples of timing diagrams of an output voltage of the rectifier circuit in the power converter circuit shown in FIG. 1.
Figure 3B:
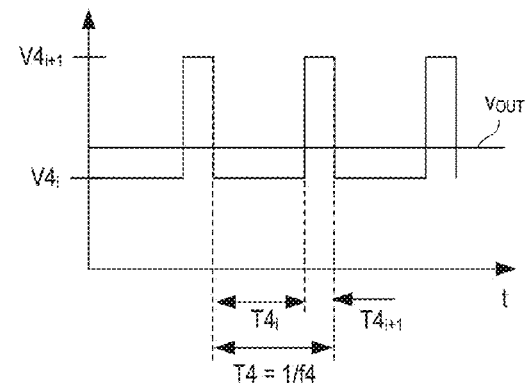

FIGS. 3A and 3B show two different examples of how the selector circuit 5 may approximate a certain instantaneous level of the output voltage $v_{OUT}$ based on two neighboring DC link voltages. These DC link voltages are denoted as $V4_i$ and $V4_{i+1}$ in FIGS. 3A and 3B. These DC link voltages $V4_i$, $V4_{i+1}$ may represent any two neighboring DC link voltages shown in FIG. 2C, wherein $V_{IN0}$ is also referred to as $V4_n$ and zero (0) is also referred to as $V4_0$ in FIG. 2C. Referring to FIGS. 3A and 3B, the selector circuit 5 operates at a switching frequency f4, so that there is a plurality of successive operation cycles each having a duration T4=1/f4. The switching frequency f4 of the selector circuit 5 can be higher than, lower than or equal the frequency of the chopper voltage f2. According to one example, each of these frequencies f2 and f4 is selected from between several kilohertz (kHz) and several megahertz (MHz), in particular between 10 kHz and 1 MHz.

If the desired instantaneous voltage level of the output voltage $v_{OUT}$ is between the neighboring DC link voltages $V4_i$, $V4_{i+1}$ in each of the plurality of successive operation cycles there is a time period $T4_i$ when the lower one $V4_i$ of the two neighboring DC link voltages $V4_i$, $V_{i+1}$ is output by the selector circuit 5, and a time period $T4_{i+1}$ when the higher one $V4_{i+1}$ of the two neighboring DC link voltages $V4_i$, $V4_{i+1}$ is output by the selector circuit 5. A ratio between $T4_{i+1}$ and $T4_i$ is dependent on the relationship between the instantaneous level of the input voltage $v_{OUT}$ and the two DC link voltages $V4_i$, $V4_{i+1}$. FIG. 3A shows an example in which the output voltage $v_{OUT}$ is closer to the higher DC link voltage $V4_{i+1}$ so that $T4_{i+1}$ is longer than $T4_i$. FIG. 3B shows an example in which the output voltage $v_{OUT}$ is closer to $V4_i$ so that $T4_i$ is longer than $T4_{i+1}$. In general, a relationship between $T4_{i+1}$ and T4 can be expressed as $$\frac{T4_{i+1}}{T4} = a, \tag{1a}$$

if $v_{OUT} = V4_i + (V4_{i+1} - V4_i) \cdot a$, and $T4_i$ is given by $$T4_i = T4 - T4_{i+} \tag{1b}$$

In general, if $v_{OUT}=m \cdot V_{IN0}$, whereas m is the modulation index, and if $V4_i \le v_{OUT} \le V4_{i+1}$ "a" can also be expressed as $$a = \frac{m - m_i}{m_{i+1} - m_i}, \tag{2}$$

wherein $m_i = V4_i/V_{IN0}$ and $m_{i+1} = V4_{i+1}/V_{IN0}$.

Figure 4:
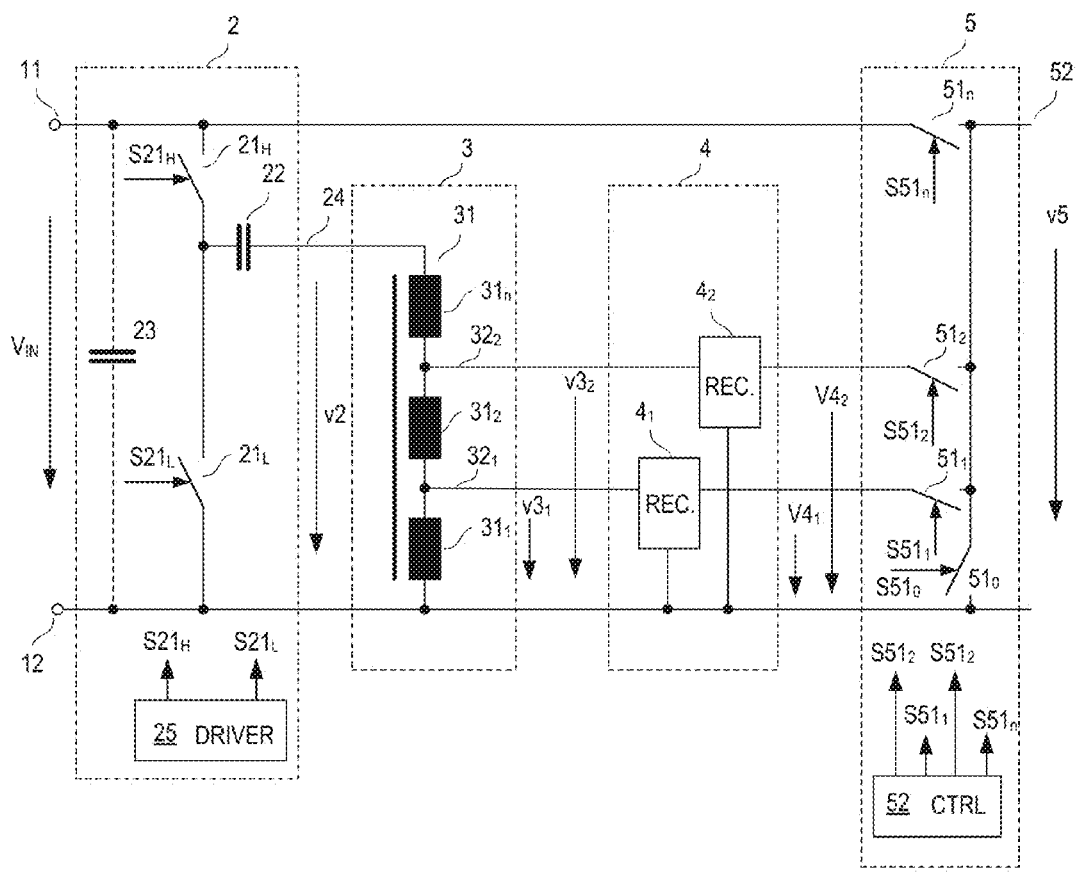
FIG. 4 shows examples of the chopper circuit, the autotransformer circuit, the rectifier circuit, and the selector circuit in greater detail.

FIG. 4 shows one example of a power converter circuit of the type shown in FIG. 1 in greater detail. In this example, the chopper circuit 2 includes a half-bridge with a high-side switch $21_H$ and a low-side switch $21_L$. The high-side switch $21_H$ and the low-side switch $21_L$ are connected in series between the first input node 11 and the second input node 12. A capacitor 22, which is referred to as chopper capacitor 22 in the following, is connected between a tap of the half-bridge and an output 24 of the chopper circuit 2. The "tap" of the half-bridge is a circuit node common to the high-side switch $21_H$ and the low-side switch $21_L$. The chopper voltage v2 is available between the output 24 of the chopper circuit 2 and a reference node, which is the second input node 12 in this example. Optionally, an input capacitor 23 is connected between the first input node 11 and the second input node 12, respectively. The high-side switch $21_H$ and the low-side switch $21_L$ switch on and off in accordance with a respective drive signal $S21_H$, $S21_L$ generated by a drive circuit 25. The drive circuit 25 switches on and off the high-side switch $21_H$ and the low-side switch $21_L$ alternately so that only one of the high-side switch $21_H$ and the low-side switch $21_L$ is switched on at the same time. The drive circuit 25 operates the high-side switch $21_H$ and the low-side switch $21_L$ in accordance with the desired frequency f2 of the chopper voltage v2, explained with reference to FIG. 2B. According to one example, the drive circuit 25 operates the high-side switch $21_H$ and the low-side switch $21_L$ at 50% duty-cycle. That is, each of the high-side switch $21_H$ and the low-side switch $21_L$ is switched on 50% of one period T2. This is explained with reference to FIG. 5 below.

Figure 5:
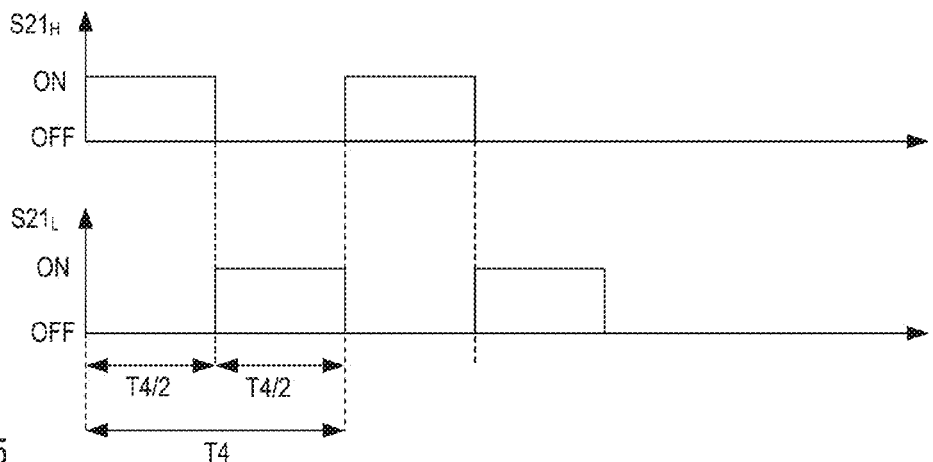
FIG. 5 shows timing diagrams of the drive signals of a half-bridge included in the chopper circuit shown in FIG. 4.

FIG. 5 shows examples of timing diagrams of the drive signals $S21_H$, $S21_L$ of the high-side switch $21_H$ and the low-side switch $21_L$. Referring to FIG. 5, each of these drive signals $S21_H$, $S21_L$ can have an on-level that switches on the respective switch and an off-level that switches off the respective switch. Just for the purpose of explanation, the on-level is a high signal level and the off-level is a low signal level in the example shown in FIG. 5. In the following, an on-period of the respective drive signal $S21_H$, $S21_L$ is a time period in which the respective drive signal $S21_H$, $S21_L$ has an on-level, and an off-period is a time period in which the respective drive signal $S21_H$, $S21_L$ has an off-level. Referring to FIG. 5, on-periods of the two drive signals $S21_H$, $S21_L$ do not overlap, so that only one of the high-side switch $21_H$ and the low-side switch $21_L$ is switched on at the same time. According to one example (not shown in FIG. 5), there is a dead time between the time when one of the high-side switch $21_H$ and the low-side switch $21_L$ switches off and the time when the other one of the high-side switch $21_H$ and the low-side switch $21_L$ switches on. This may serve to safely prevent a cross current in the half-bridge. Referring to FIG. 5, a duration of the on-periods of each of the drive signals $S21_H$ and $21_L$ drive signal $S21_L$ is T4/2. That is, each of the high-side switch $21_H$ and the low-side switch $S1_L$ is operated at a duty-cycle of 50% (the duty-cycle is the ratio between the on-period and the overall period T4 of one drive cycle).

A chopper circuit 2 as explained with reference to FIGS. 4 and 5, generates a chopper voltage v2 that has a timing diagram as shown in FIG. 2B in which the average value (mean value) is zero, that is, V2=0 and in which the amplitude v2' is half the voltage level of the input voltage $V_{IN}$, that is, $v2'=V_{IN0}/2$. Thus, in the chopper circuit 2 shown in FIG. 4, the chopper voltage v2 alternates between $+V_{IN0}/2$ and $-V_{IN0}/2$ at a frequency of f2, wherein in each period of the chopper voltage, the lower voltage level $-V_{IN0}$ prevails half of the time period T4, and the upper level $+V_{IN0}$ prevails half of the time period T4.

In the power converter circuit shown in FIG. 4, the autotransformer 31 receives the chopper voltage v2. That is, the autotransformer 31 is coupled to the output 24 of the chopper circuit 2 such that the chopper voltage v2 is applied to the autotransformer 31, which includes a series circuit with a plurality of windings $31_1$, $31_2$, $31_n$ that are inductively couples. Just for the purpose of illustration, the autotransformer 31 shown in FIG. 4 includes n=3 windings and n−1=2 taps $32_1$, $32_2$. At each of the taps $32_1$, $32_2$ one tap voltage $v3_1$, $v3_2$ is available. Each tap voltage $v3_1$, $v3_2$ is substantially proportional to the chopper voltage v2 received by the autotransformer 31, wherein a proportionality factor between one tap voltage and the chopper voltage v2 is dependent on the number of turns of the individual windings $31_1$, $31_2$, $31_n$. A first tap voltage $v3_1$, for example, is the voltage across a first winding $31_1$. This first tap voltage $v3_1$ is given by $$v3_1 = \frac{N_1}{N_{tot}} \cdot v2, \qquad (3)$$

where $N_1$ is the number of turns of the first winding $31_1$ and $N_{tot}$ is the overall number of windings of the autotransformer 31. In the example shown in FIG. 4, wherein the autotransformer 31 includes the three windings $31_1$, $31_2$, $31_n$, $$N_{tot}=N_1+N_2+N_n \qquad (4),$$

where $N_2$ is the number of turns of a second winding $31_2$ and $N_n$ is the number of turns of an n-th (the third in this example) winding $31_n$. In the example shown in FIG. 4, a second tap voltage $v3_2$, which is the voltage between the second tap $32_2$ and the reference node (the second input node in this example) is the voltage across the first winding $31_1$ and the second winding $31_2$, so that the second tap voltage $v3_2$ is given by $$v3_2 = \frac{N_2 + N_1}{N_{TOT}} \cdot v2. \qquad (5)$$

According to one example, the individual windings $31_1$, $31_2$, $31_n$ have the same number of turns, that is, $N_1=N_2=N_n$. In this case, $v3_1=\frac{1}{3}\cdot v2$ and $v3_2=\frac{2}{3}\cdot v2$. In general, if the autotransformer 31 includes an arbitrary number of n windings that each have the same number of turns, n−1 different tap voltages $v3_k$ can be obtained, wherein each of these tap voltages is given by $$v3_k = \frac{k}{n} \cdot v2, \qquad (6)$$

wherein k is selected from between 0 and n−1.

In the example shown in FIG. 4, the rectifier circuit 4 includes several rectifier stages in this example) $4_1$, $4_2$, with each of these rectifier stages $4_1$, $4_2$ receiving one of the tap voltages $v3_1$, $v3_2$ and being configured to generate one of the DC link voltages $V4_1$, $V4_2$ based on the respective tap voltage $v3_1$, $v3_2$.

Referring to FIG. 4, the selector circuit 5, besides the DC link voltages $V4_1$, $V4_2$ receives the input voltage $V_{IN}$ and includes a plurality of switches $51_0$-$51_n$, wherein each of these switches is configured to connect one of the plurality of voltages received by the selector circuit 5 to an output 52 of the selector circuit 5. The voltages (voltage levels) received by the selector circuit 5 shown in FIG. 4 are the DC link voltages $V4_1$, $V4_2$ output by the rectifier stages $4_1$, $4_2$ and the input voltage $V_{IN}$. In this example, each of switches $51_1$, $51_2$ shown in FIG. 4 serves to connect one of the DC link voltages $V4_1$, $V4_2$ to the output 52, and a switch 51, serves to connect the input voltage $V_{IN}$ to the output 52. Additionally, the selector circuit 5 includes a switch $51_0$ coupled between the output 52 and the second input node 12, which serves as the reference node in the power converter circuit shown in FIG. 4, whereas the output voltage v5 is zero if tis switch $51_0$ is switched on. The individual switches $51_0$-$51_n$ are driven by drive signals $S51_0$-$S51_n$ generated by a control circuit 52. According to one example, the control circuit 52 is configured to generate the drive signals $S51_0$-$S51_n$ such that only one of the switches $51_0$-$51_n$ is switched on at the same time.

Figure 6:
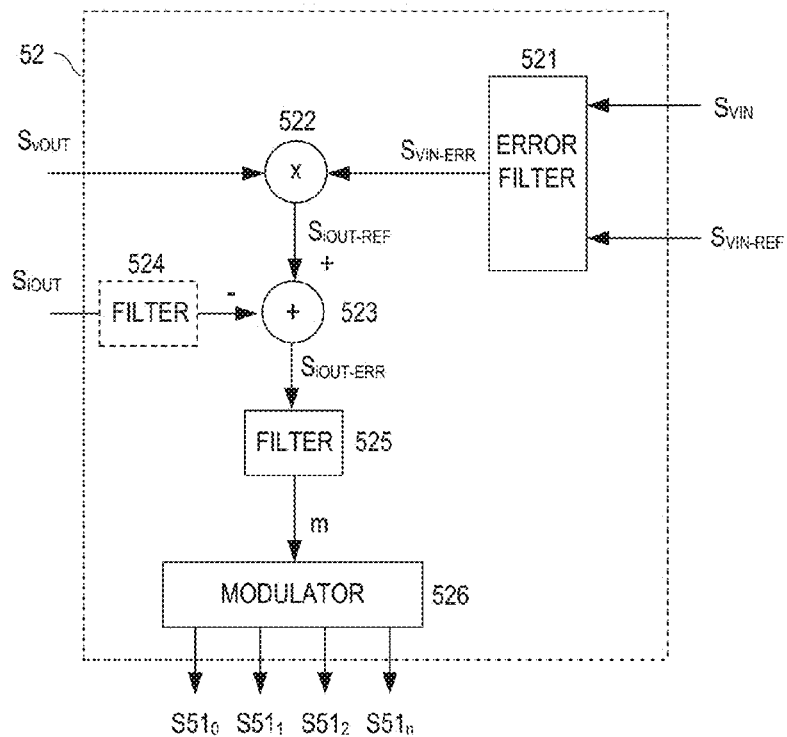
FIG. 6 shows one example of a controller in the selector circuit shown in FIG. 5.

One example of the control circuit 52 is explained with reference to FIG. 6. FIG. 6 shows a block diagram of one example of the control circuit 52 that controls operation of the selector circuit 5 and, therefore, controls the selector output voltage v5. The control circuit 52 shown in FIG. 6 generates the selector output voltage v5 such that the input voltage $V_{IN}$ is regulated and the output current $v_{OUT}$ (see FIG. 1) has a predefined signal waveform. This control circuit 52 receives an input voltage signal $S_{VIN}$ that represents the input voltage $V_{IN}$. This input voltage signal $S_{VIN}$ can be obtained by any kind of voltage measurement circuit, which is not shown in the drawings. An error filter 521 receives the input voltage signal $S_{VIN}$ and compares the input voltage signal $S_{VIN}$ with an input voltage reference signal $S_{VIN\text{-}REF}$. This input voltage reference signal $S_{VIN\text{-}REF}$ represents a desired voltage level of the input voltage $V_{IN}$. The error filter 521 calculates a difference between the input voltage signal $S_{VIN}$ and the input voltage reference signal $S_{VIN\text{-}REF}$ and generates an input voltage error signal $S_{VIN\text{-}ERR}$ based on this difference. According to one example, the input voltage error signal $S_{VIN\text{-}ERR}$ is obtained by filtering this difference using one of an integral (I) filter, a proportional-integral (PI) filter, a proportional-integral-derivative (PID) filter, or the like. A multiplier 522 receives the input voltage reference signal $S_{VIN\text{-}ERR}$ and a signal representing a desired waveform of the output current $I_{OUT}$.

According to one example, the power converter circuit supplies the output current $i_{OUT}$ to a power grid, so that the output voltage $v_{OUT}$ is defined by the power grid, and it is desired to generate the output current $i_{OUT}$ to be in phase with the output voltage $v_{OUT}$ or have a predefined phase difference relative to the output voltage $v_{OUT}$. In each case, the desired waveform of the output current $i_{OUT}$ is given by the output voltage your. The signal defining the desired waveform of the output current $i_{OUT}$ is an output voltage signal $S_{vOUT}$ in this example. The output voltage signal $S_{vOUT}$ can be obtained by measuring the output voltage $V_{OUT}$ using any kind of current measurement circuit (not shown in the figures). By multiplying the output voltage signal $S_{vOUT}$ and the input voltage error signal $S_{VIN\text{-}ERR}$, the multiplier 522 generates an output current reference signal $S_{iOUT\text{-}REF}$ which defines the desired output current $i_{OUT}$. Based on this output current reference signal $S_{iOUT\text{-}REF}$, the controller 52 generates an output current error signal $S_{iOUT\text{-}ERR}$ by subtracting an output current signal $S_{iOUT}$, or a filtered version of this output current signal $S_{iOUT}$, from the output current reference signal $S_{iOUT\text{-}REF}$. An optional filter 524 that filters the output current signal $S_{iOUT}$ in order to obtain a filtered version of the output current signal $S_{iOUT}$ is a low-pass filter, for example. The output current signal $S_{iOUT}$ may be obtained by measuring the output current $i_{OUT}$ using any kind of current measurement circuit (not shown in the figures).

Referring to FIG. 6, the output current error signal $S_{iOUT\text{-}ERR}$ is received by another filter 525 that generates the modulation index m from the output current error signal $S_{iOUT\text{-}ERR}$. According to one example, the filter 525 has one of an integrating (I) characteristic, a proportional-integral (PI) characteristic, or a proportional-integral-derivative (PID) characteristic. A modulator 526 receives the modulation index in and generates the drive signals $S51_0$-$S51_n$ based on the modulation index m, in the way basically explained with reference to FIG. 2C herein before.

It can be shown that, in case the output voltage $v_{OUT}$ is a periodic voltage, the modulation index m is also a periodic signal, substantially with the same frequency as the output voltage $v_{OUT}$. For the purpose of explanation, it is assumed that the output voltage $v_{OUT}$ is a rectified sine voltage with a frequency of 100 Hz or 120 Hz respectively. Based on such rectified sine voltage, a sine voltage with a frequency of 50 Hz or 60 Hz, respectively, can easily be generated by using an unfolding circuit explained herein further below.

Figure 7:
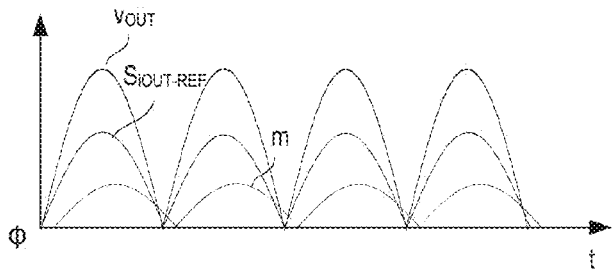
FIG. 7 shows examples of timing diagrams of signals in the controller circuit shown in FIG. 6.

FIG. 7 schematically illustrates the relationship between the output voltage $v_{OUT}$ and the modulation index m. As, referring to FIG. 6, the output current reference signal $S_{iOUT\text{-}REF}$ is obtained by multiplying the output voltage signal $S_{vOUT}$ with the input voltage error signal $S_{VIN\text{-}ERR}$, the output current reference signal $S_{iOUT\text{-}REF}$ is proportional to the output voltage $v_{OUT}$ (when assuming that the voltage level of the input voltage $V_{IN}$ does not change during the time period illustrated in FIG. 7). Referring to FIG. 7, there may be a phase-shift $\Phi$ between the output current reference signal $S_{iOUT\text{-}REF}$ and the modulation index m. This phase difference $\Phi$ which is at most several degrees, may vary based on the difference between the output current reference signal $S_{iOUT\text{-}REF}$ and the filtered output current signal $S_{iOUT}$. Further, it can be shown that an amplitude of the varying modulation index m is dependent on the amplitude of the input voltage $V_{IN}$, so that the input voltage $V_{IN}$ can be regulated by suitably varying the modulation index m in the way explained with reference to FIG. 6. According to one example, the filter 525 is configured to generate the modulation index m as a normalized signal with values of between 0 and 1, wherein the modulation index m is one in those cases in which the input voltage $V_{IN}$ is to be output as the selector voltage v5.

The control circuit 52 shown in FIG. 6 is only one example. This type of control may be used in a power converter that receives the input voltage $V_{IN}$ from a power source with a varying output power such as, for example, a PV panel. In this case, controlling the input voltage $V_{IN}$ to be constant is equivalent to adapting the input power $P_{IN}$ of the power converter circuit to the power supplied by the power source.

According to another example, the input voltage $V_{IN}$ is not regulated by the power converter circuit (because, for example, a regulator outside the power converter circuit regulates the input voltage $V_{IN}$). In this case, the error filter 521 and the multiplier 522 can be omitted. The subtractor 523 receives the signal defining the waveform of the output current instead of the output current reference signal $S_{iOUT\text{-}REF}$, in this case. The signal defining the desired waveform of the output current $i_{OUT}$ is the output voltage signal $S_{vOUT}$ in the example shown in FIG. 6.

According to another example, the waveform of the output voltage $v_{OUT}$ is not defined by an external source such as a voltage grid, but by the power converter circuit. One type of application where the power converter circuit generates the waveform of the output voltage $v_{OUT}$ is a motor drive application, where the load Z is a motor driven by the power converter circuit. In this case, a controller (not shown) generates a sequence of modulation indices (with each modulation index defining one instantaneous voltage level of the output voltage $v_{OUT}$ or the selector output voltage v5, respectively) such that the output voltage $v_{OUT}$ has a desired waveform and a desired frequency.

Figure 8:
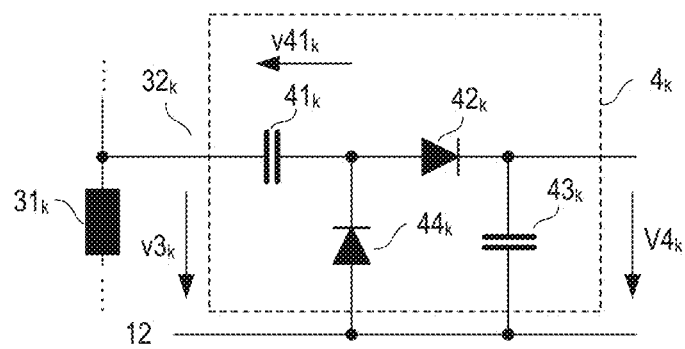
FIG. 8 shows one example of a rectifier stage in the rectifier circuit shown in FIG. 5.

FIG. 8 shows one example of how the rectifier stages $4_1$, $4_2$ in the power converter circuit shown in FIG. 4 may be implemented. In FIG. 8, $31_k$ denotes any of the windings $31_1$, $31_2$ shown in FIG. 4, $32k$ denotes the respective tap connected to the winding $31_k$, $4_k$ denotes the respective rectifier stage, and $V4_k$ denotes the DC link voltage generated by the respective rectifier stage $4_k$. Referring to FIG. 8, the rectifier stage $4_k$ includes an output capacitor $43_k$ across which the DC link voltage $V4_k$ is available. Another capacitor $41_k$, which is referred to as tap capacitor in the following, is connected to the tap $32_k$. A first rectifier element $42_k$, such as a diode, is connected between the tap capacitor $41_k$ and the output capacitor $43_k$, and another rectifier element $44_k$, such as a diode is connected between a circuit node common to the tap capacitor $41_k$ and the first rectifier element $42_k$ and the reference node (which is the second input node 12 in this example).

Figure 9:
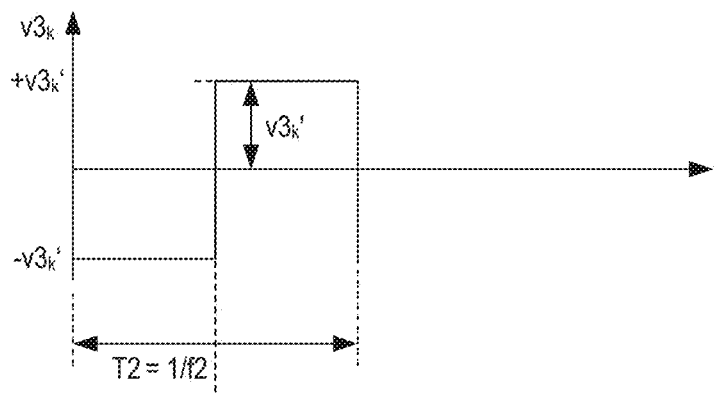
FIG. 9 illustrates one example of a timing diagram of a tap voltage received at an input of the rectifier stage shown in FIG. 8.

One way of operation of the rectifier stage $4_k$ shown in FIG. 8 is explained with reference to FIG. 9 that illustrates a timing diagram of the tap voltage $v3_k$ (which is the voltage between the tap $32_k$ and the reference node 12) during one period T2 of the chopper circuit 2. Referring to the above, the tap voltage $v3_k$ is proportional to the chopper voltage v2. As, referring to the above, the chopper voltage v2 generated by the chopper circuit 2 shown in FIG. 4 is a zero-mean square voltage that varies between a negative signal level and a positive signal level the tap voltage $v3_k$ is also a zero-mean square voltage that varies between a negative signal level and a positive signal level. The negative signal level of the tap voltage $v3_k$ is referred to as $-v3_k'$ and the positive level is referred to as $+v3_k'$ in FIG. 9. When the tap voltage $v3_k$ has the negative level, a voltage $v41_k$ across the tap capacitor $41_k$ substantially equals $-v3_k$ (if conduction losses in the rectifier element $44_k$) are neglected, so that a magnitude of the voltage v41 equals the amplitude $v3_k'$ of the tap voltage $v3_k$. When the tap voltage $v3_k$ becomes positive, the electrical potential at the tap $32_k$ rises to $v3_k'$, so that the output capacitor $43_k$ is charged via the first rectifier element $42_k$ by the charge stored in the tap capacitor $41_k$. In this rectifier stage $4_k$, the output capacitor $V4_k$ is charged to $2 \cdot v3_k'$, which is twice the amplitude of the tap voltage $v3_k$. Consequently, in the power converter circuit shown in FIG. 4, the DC link voltages $V4_1$, $V4_2$ are given by $$V4_1 = \frac{N_1 \cdot V_{IN0}}{N_{tot}}, \quad (7a)$$

$$V4_2 = \frac{(N_1 + N_2) \cdot V_{IN0}}{N_{tot}}. \quad (7b)$$

Figure 10:
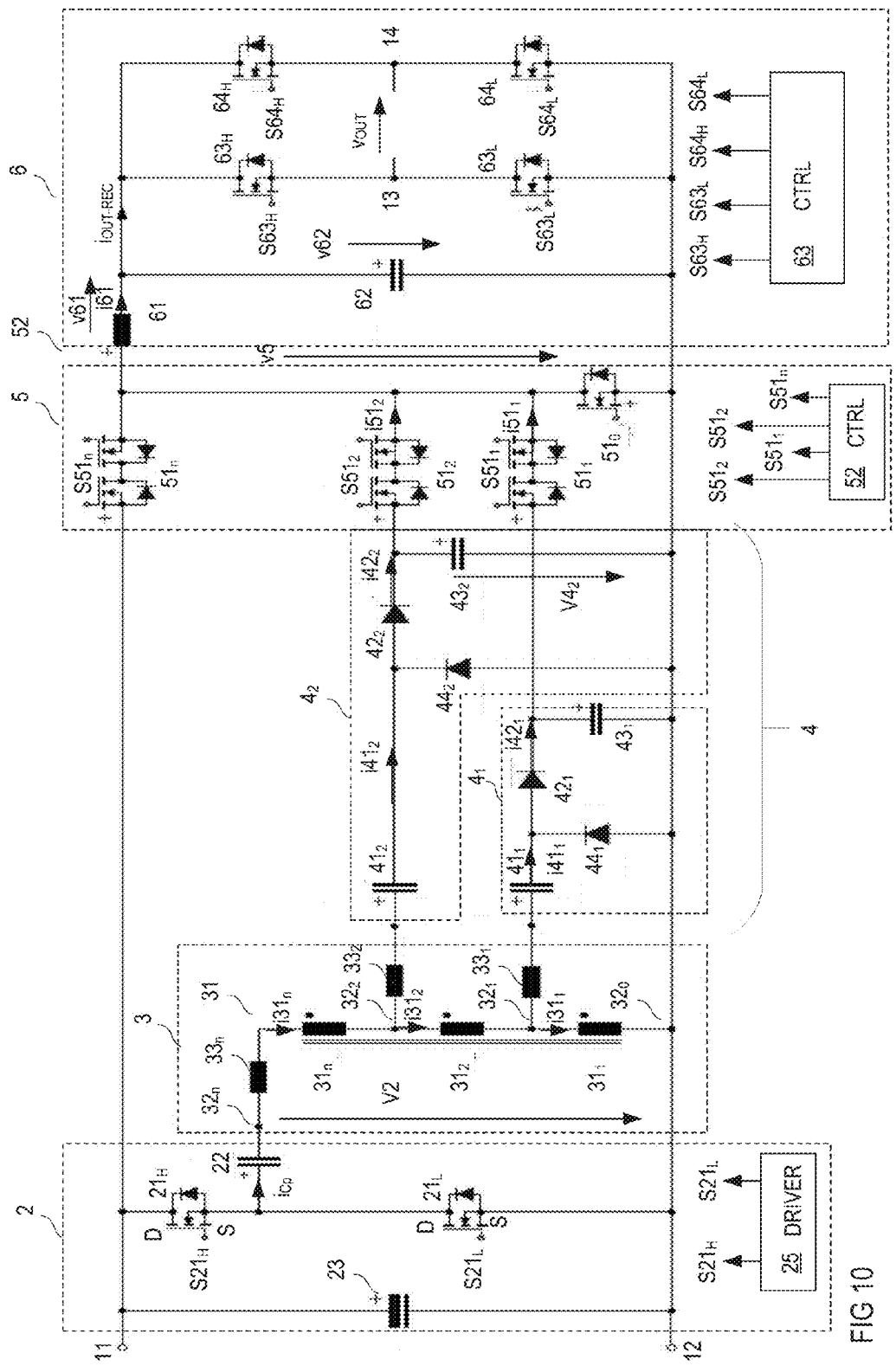
FIG. 10 shows one example of a power converter circuit that is based on the power converter circuit shown in FIG. 5 and includes an optional filter circuit, which is illustrated in greater detail.

FIG. 10 shows a power converter circuit with a chopper circuit 2, an autotransformer circuit 3, a rectifier circuit 4 and a selector circuit 5 of the type shown in FIG. 4. In the power converter circuit shown in FIG. 10, the rectifier stages $4_1$, $4_2$ of the rectifier circuit 4 are implemented as explained with reference to FIG. 8 and drawn in detail in FIG. 10. In the chopper circuit 2, the high-side switch $21_H$ and the low-side switch $21_L$ are each implemented as a MOSFET, in particular as an n-type MOSFET. This however, is only an example, other types of electronic switches such as IGBTs (Insulated Gate Bipolar Transistors), IFETs (Junction Field Effect Transistors), Brfs (Bipolar Junction Transistors) or HEMTs (High Electron-Mobility Transistors) may be used as well. In FIG. 10, a diode that is drawn to be connected between a drain node D and a source node S of the respective MOSFET $21_H$, $21_L$ represents an internal body diode of the respective MOSFET $21_H$, $21_L$ and/or an external diode connected in parallel with the drain-source path of the MOSFET.

In the example shown in FIG. 10, the switch $51_0$ that is connected between the output 52 of the selector circuit 5 and the reference node 12 is also implemented as a MOSFET, in particular an n-type MOSFET. This however, is only an example. Another type of electronic switch such as an IGBT (Insulated Gate Bipolar Transistor), a JFET (Junction Field Effect Transistors), a BJT (Bipolar Junction Transistor) or a HEMT (High Electron-Mobility Transistors) may be used as well. The other switches $51_1$, $51_2$, $51_n$ of the selector circuit may each include two MOSFETs that are connected in series such that internal body diodes (which are also illustrated in FIG. 10) of these MOSFETs are connected back to back. In the example shown in FIG. 10, the MOSFETs that are connected in series have the same type, which is an n-type in this example. The two MOSFETs forming one switch may receive the same drive signal. That is, for example, the MOSFETs forming switch $51_1$ each receive the drive signal $S51_1$ generated by the control circuit 52. According to another example, the two MOSFETs of one switch are driven based on the same drive signal, but in accordance with a modulation scheme such as, for example, a modulation scheme known as current dependent matrix converter commutation strategy. Such modulation scheme, for example, may switches off only one of the MOSFETs but leave the other MOSFET in an on state so as to allow a current flow in one direction (via the MOSFET that is in the on-state and the body diode of the other MOSFET). This may be used to allow inductances in the circuit to commutate.

Using MOSFETs to implement the switches $51_1$, $51_2$, $51_n$ is only an example. Other types of electronic switches such as IGBTs (Insulated Gate Bipolar Transistors), JFETs (Junction Field Effect Transistors), BJTs (Bipolar Junction Transistors) or HEMTs (High Electron-Mobility Transistors) may be used as well.

In the power converter circuit shown in FIG. 10, the output filter 6 includes an LC filter 61, 62 that receives the selector output voltage v5 and generates an LC filter output voltage v62. The LC filter output voltage v62 is a smoothed (filtered) version of the selector output voltage v5. If, for example, the selector output voltage v5 has a waveform as shown in FIG. 2C, the smoothed version of the selector output voltage v5 generated by the LC filter has a waveform as denoted by your shown in FIG. 2C, The LC filter includes a series circuit with an inductor 61 and a capacitor 62. This series circuit is connected between the output 52 and the reference node 12 in the example shown in FIG. 10, whereas the LC filter output voltage v62 is available across the capacitor 62.

Figure 11:
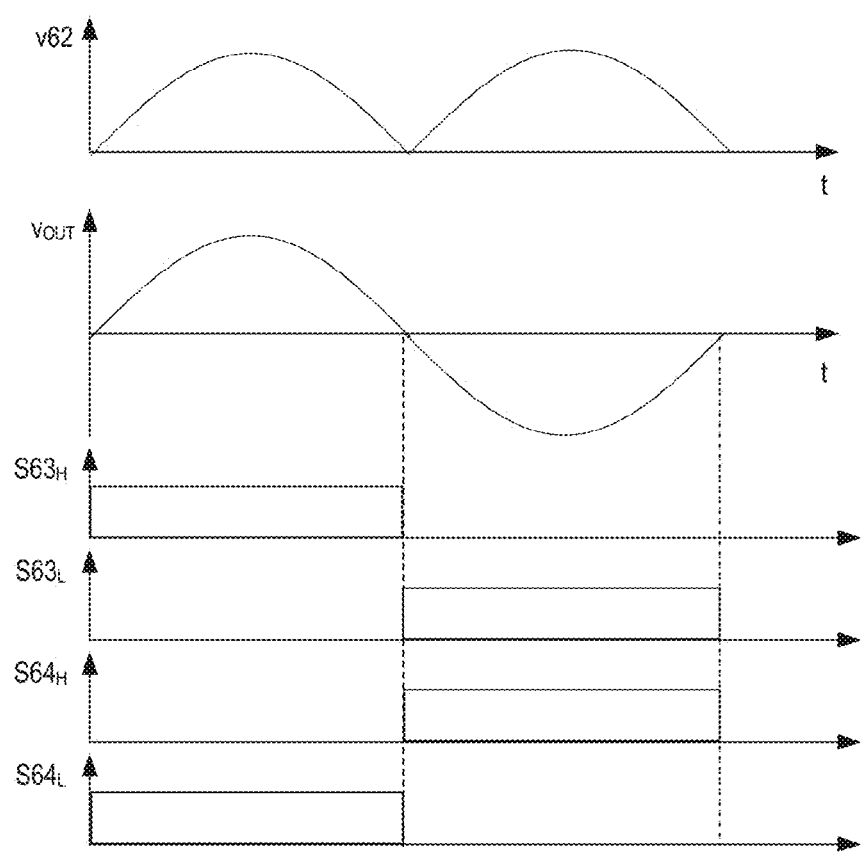
FIG. 11 shows timing diagrams that illustrate one way of operation of an unfolding circuit in the filter circuit shown in FIG. 10.

Referring to FIG. 10, the output filter 6 furthermore includes an unfolding bridge. The unfolding bridge includes two half-bridges each connected in parallel with the capacitor 62 of the LC filter. A first one of these two half-bridges includes a first high-side switch $63_H$ and a first low-side switch $63_L$, and a second one of these two half-bridges includes a second high-side switch $64_H$ and a second low-side switch $64_L$. A tap of the first half-bridge forms the first output node 13 and a tap of the second half-bridge forms the second output node 14. The unfolding bridge is configured to generate an alternating output voltage $v_{OUT}$ based on the LC filter output voltage v62. According to one example, the power converter circuit generates the filter output voltage v62 such that it has a rectified sine waveform and the unfolding bridge generates the output voltage $v_{OUT}$ to have a sine waveform based on the filter output voltage v62. This is explained with reference to FIG. 11 in which example timing diagrams of the filter output voltage v62, the corresponding output voltage $v_{OUT}$ of the power converter circuit and of drive signals $S63_H$, $S63_L$, $S64_H$, $S64_L$ of the individual switches of the half-bridges of the unfolding bridge are shown. Just for the purpose of illustration it is assumed that a high-level of a drive signal $S63_H$-$S64_L$ switches on the respective switch $63_H$-$64_L$ and that a low-level switches off the respective switch $63_H$-$64_L$. Referring to FIG. 11, the unfolding bridge changes its switching state only once in each period of the filter output voltage V62, namely at the beginning of each period. One period of the output voltage $v_{OUT}$ (wherein one such period is shown in FIG. 11) includes two periods of the filter output voltage v62. That is, each period of the filter output voltage v62 forms one half-period of the final output voltage $v_{OUT}$. In one of these two half-periods, the filter output voltage v62 forms the output voltage your, and in the other half-period, the filter output voltage v62 is inverted by the unfolding bridge. In the example shown in FIG. 11, in a first half-period of these two half-periods, the first high-side switch $63_H$ and the second low-side switch $64_L$ are on in order to apply the filter output voltage v62 to the output nodes 13, 14. In the second half-period, the first low-side switch $63_L$ and the first high-side switch $64_H$ are on in order to apply the inverted filter output voltage V62 the output nodes 13, 14.

In case the power converter circuit includes an unfolding bridge, the selector circuit 5 generates an output voltage with only one polarity. In this case, the control circuit 52 shown in FIG. 6 can be modified such that the output voltage signal $S_{vOUT}$ represents a rectified output voltage $v_{OUT}$ instead of the output voltage $v_{OUT}$, and the output current signal $S_{iOUT}$ represents the current $i_{OUT\text{-}REC}$ flowing from the LC filter into the unfolding bridge.

Figure 12:
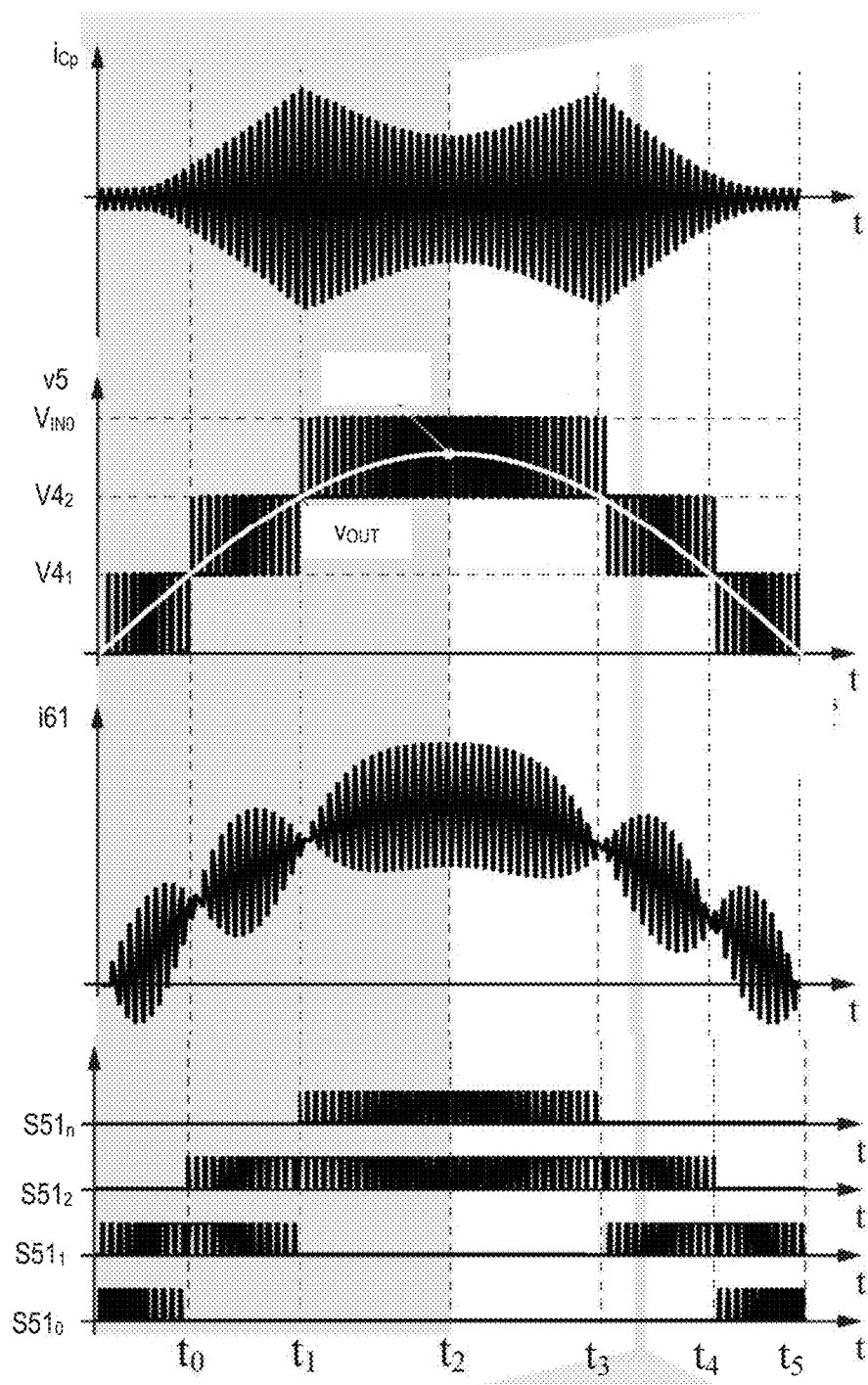

FIG. 12 shows timing diagrams of several signals occurring in the power converter circuit shown in FIG. 10 during operation. These timing diagrams serve to illustrate one way of operation of this power converter circuit. In particular, FIG. 12 shows timing diagrams of a current $i_{C_p}$ through the chopper capacitor 22, the selector output voltage v5, a current i61 through the inductor 61 of the LC filter 61, 62 and of the drive signals $S51_0$-$S51_n$ of the switches in the selector circuit 5. In FIG. 10, the timing diagrams are shown during one half-period of a sinusoidal output voltage $v_{OUT}$ or one period of a rectified sinusoidal output voltage, respectively. A rectified sinusoidal output voltage can be generated by the power converter circuit shown in FIG. 10 by omitting the unfolding bridge.

Referring to FIG. 12, operation of the power converter circuit during one half-period (one period) of the output voltage $v_{OUT}$ can be subdivided into six sub-periods, namely a first sub-period, which is between a beginning of the half-period (period) and $t_0$, a second sub-period, which is between $t_0$ and $t_1$, a third sub-period, which is between $t_1$ and $t_2$, a fourth sub-period, which is between $t_2$ and $t_3$, a fifth sub-period, which is between $t_3$ and $t_4$, and a sixth sub-period, which is between $t_4$ and $t_5$. Referring to FIG. 12, $t_0$ and $t_5$ are the times when the voltage level of the output voltage $v_{OUT}$ crosses the voltage level of the first DC link voltage $V4_1$, $t_1$ and $t_3$ are the times when the voltage level of the output voltage $v_{OUT}$ crosses the voltage level of the second DC link voltage $V4_2$, and $t_2$ is the time when the output voltage $v_{OUT}$ reaches its maximum. Operation in the first sub-period equals operation in the sixth sub-period, operation in the second sub-period equals operation in the fifth sub-period, and operation in the third sub-period equals operation in the fourth sub-period, so that only operation in the first, second and the third sub-period is explained in the following. These first, second and third sub-periods are sub-periods that cover a time period between a rime, when the output voltage $v_{OUT}$ is zero and a rime, when the output $v_{OUT}$ reaches its maximum. Thus, these three sub-periods cover one quarter (one half) of a period of a sinusoidal (a rectified sinusoidal) output voltage $v_{OUT}$.

Referring to FIG. 12, in the first sub-period, the selector circuit 5 switches between the first DC link voltage $V4_1$ and zero. Consequently, switches $51_n$ and $51_1$ of the selector 5 are switched on and off in an alternating fashion during this first sub-period. In the second sub-period, the selector 5 switches between the first DC link voltage $V4_1$ and the second DC link voltage $V4_2$, so that switches $51_1$ and $51_2$ are switched on and off in an alternating fashion. In the third sub-period, the selector 5 switches between the second DC link voltage $V4_2$ and the input voltage $V_{IN0}$, so that switches $51_2$ and $51_n$ of the selector are switched on and off in an alternating fashion. During the first and second sub-period, the current $i_{C_p}$ through the chopper capacitor 22 increases as the voltage level of the output voltage $v_{OUT}$ increases. Referring to FIG. 12, the current $i_{C_p}$ does not decrease to zero even if the output voltage $V_{OUT}$ is zero. This is due to a magnetizing current of the autotransformer 31 During the third sub-period the capacitor current $i_{C_p}$ decreases as during this sub-period switch $51_n$ that is directly connected to the first input node 11 conducts (with the duty-cycle increases as the voltage level of the output voltage $v_{OUT}$ increases), whereas the current through switch $51_n$ (other than the currents through the switches $51_1$ and $51_2$) does not flow through the chopper capacitor 22.

Figure 13:
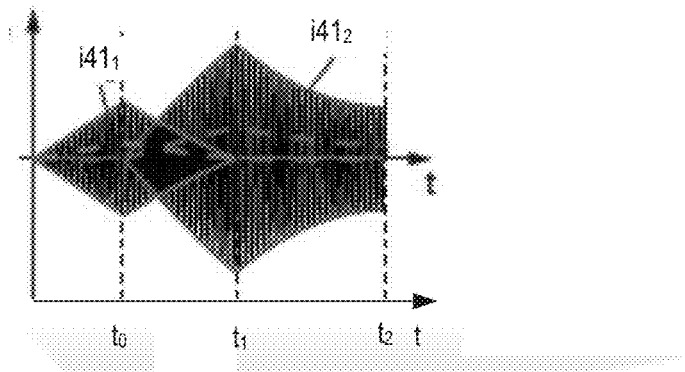

FIG. 13 illustrates the currents $i41_1$, $i41_2$ through the tap capacitances $41_1$, $41_2$ during the first three sub-periods.

Figures 14A, 14B:
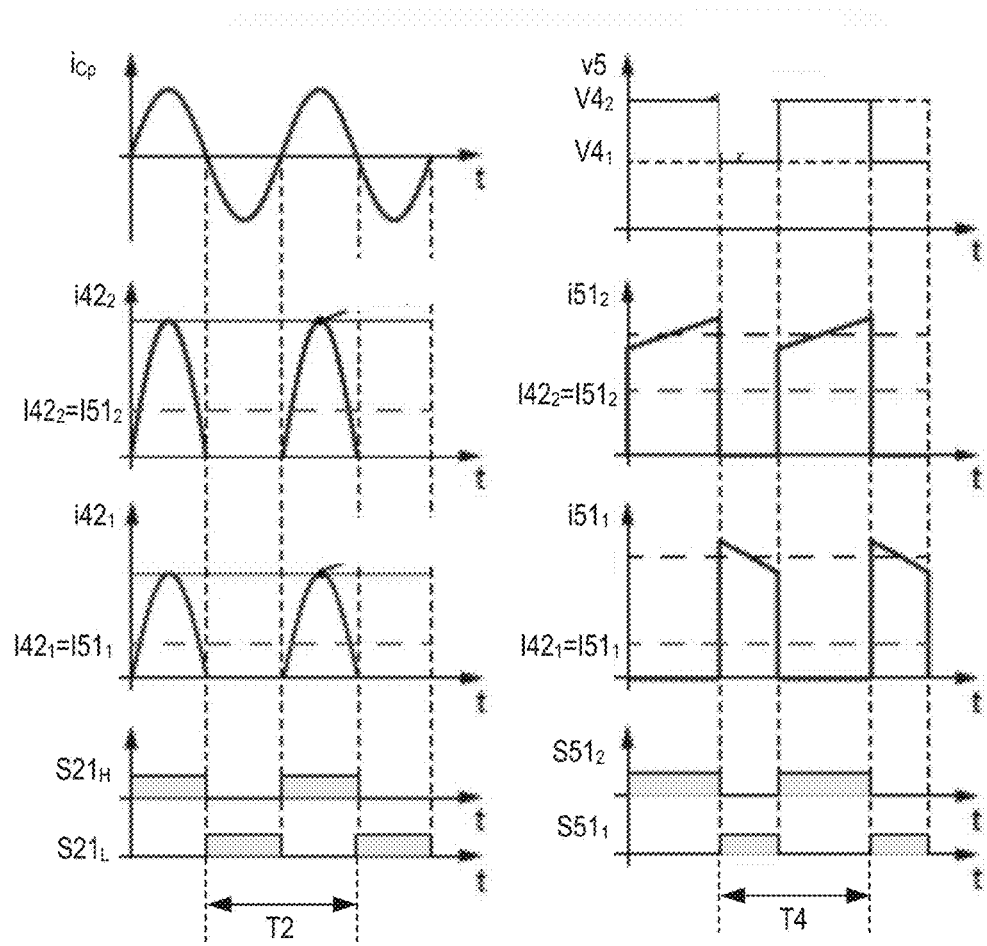

FIG. 14A shows timing diagrams of the current $i_{C_p}$ through the chopper capacitance 22, the currents $I42_2$, $I42_1$ through the second diodes $42_2$, $42_1$ in the rectifier stages $4_2$, $4_1$ and drive signals $S21_H$ of the high-side switch $21_H$ and $S21_L$ of the low-side switch $21_L$ of the chopper circuit 2 during two periods of the chopper circuit 2. FIG. 14B illustrates timing diagrams of the selector output voltage v5 currents $i51_2$, $i51_1$ through the switches $51_2$, $51_1$ in the selector circuit 5, and drive signals $S51_1$, $S52_2$ of these switches $51_1$, $51_2$ during two periods of the selector circuit 5. FIGS. 14A and 14B show the timing diagrams in the second sub-period (which is between $t_0$ and $t_1$) that is, when the selector circuit 5 switches between the second DC link voltage $V4_2$ and the first DC link voltage $V4_1$. In the example shown in FIG. 14, the switching frequency f2 of the chopper circuit 2 is adapted to the inductances and capacitances in the power converter circuit such that the current $i_{C_p}$ through the chopper capacitance 22 is a periodic current with a sinusoidal waveform. By this, the high-side switch $21_H$ and the low-side switch $21_L$ of the chopper circuit 2 can be operated in a zero current switching (ZCS) mode. That is, these switches $21_H$, $21_L$ switch on and off when the current through the respective switch is substantially zero. By this, switching losses in the chopper circuit 2 can be reduced.

Referring to FIG. 14A, each of the DC link capacitors $43_1$, $43_2$ is charged by the respective current $i42_1$, $i42_2$ each time, the high-side switch $21_H$ is switched on. As the current $i_{C_p}$ through the chopper capacitance 22 is a sinusoidal current, the charging currents of the DC link capacitors $43_1$, $43_2$ have the form of one half-period of a sinusoidal signal each time, the high-side switch $21_H$ is switched on. When the low-side switch 21 is switched off the tap capacitances $41_1$, $41_2$ are charged, as explained above, so that during these time periods, the charging currents $i42_1$, $i42_2$ of the DC link capacitors $43_1$, $43_2$ are zero.

Referring to FIG. 14B, the current $i51_2$ through the switch $51_2$ increases, when the switch $51_2$ is switched on and is zero, when the switch $51_2$ is switched off. When switch $51_2$ is switched on, a voltage v61 across the inductor 61 of the LC filter is given by $V4_2-v_{OUT}$, that is, the second DC link voltage $V4_2$ minus the output voltage your. As during the second sub-period the voltage level of the output voltage you is between the voltage level of the first DC link voltage $V4_1$ and the voltage level of the second DC link voltage $V4_2$, the voltage v61 across the inductor is higher than zero, which results in the increase of the current. Equivalently, when switch $51_1$ of the selector circuit 5 is switched on, the voltage v61 across the inductor 61 is given by $V4_1-v_{OUT}$, that is, the first DC link voltage $V4_1$ minus the output voltage $v_{OUT}$. This voltage is negative, so that the current $i51_1$ through this switch $51_1$ decreases when the switch $51_1$ is switched on and this current $i51_1$ is zero, when the switch $51_1$ is switched off. The current i61 through the inductor 61 of the LC filter is given by the current $i51_1$ plus the current $i51_2$ so that the current i61 has a triangular waveform during the second sub-period.

Referring to FIG. 10, the power converter circuit includes several series resonant circuits that can be excited by the chopper circuit 2. In order to obtain ZCS the parameters of these series resonant circuits and the switching frequency f2 of the chopper circuit 2 are suitably adapted to one another. This is explained in further detail herein below. Referring to FIG. 10, a first series resonant circuit includes the tap capacitance $41_1$ of the rectifier stage $4_1$ coupled to the first tap $32_1$, a first parasitic inductance $33_1$ of the autotransformer 31 between the first tap $32_1$ and the tap capacitor $41_1$, another parasitic capacitance $33_n$ of the autotransformer 31 in series with the n-th winding $31_n$ and the chopper capacitor 22. Another series resonant circuit includes the tap capacitor $41_2$ of the rectifier stage $4_2$ coupled to the second tap $32_2$, a second parasitic inductance $33_2$, the parasitic inductance and the chopper capacitor 22. The parasitic inductances $33_1$, $33_2$, $33_n$ of the autotransformer 31 result from leakage inductances of the autotransformer 31. In general, a power converter circuit with an autotransformer with n windings and n−1 taps includes n−1 series resonant circuits. Each of these resonant circuits is associated with one tap $32_i$ and includes the tap capacitor $41_i$ connected to the respective tap $32_i$, a leakage inductance $33_i$ at the respective tap $32_i$, the chopper capacitance 22, and the leakage inductance $33_n$ in series with the chopper capacitor 22.

These parasitic inductances $33_1$, $33_2$, $33_n$ can be obtained by measuring and/or simulating the specific autotransformer 31 employed in the power converter circuit. Based on these parasitic inductances $33_1$, $33_2$, $33_n$ and based on the desired switching frequency f2 of the chopper circuit 2, capacitances of the tap capacitors $41_1$, $41_2$, and the chopper capacitor 22 can be designed such that the switching frequency f2 of the chopper circuit 2 equals the resonant frequency of the individual series resonant circuits mentioned above so that these series resonant circuits operate in a resonant mode in each of the sub-periods explained before. Consequently, the current $i_{C_p}$ is a sinusoidal current with a frequency equal the switching frequency f2 so that the switches $21_H$, $21_L$ of the chopper circuit can be operated in the ZCS mode.

The power converter circuit operates in the resonant mode if, in each of the sub-periods explained before, each of the current $i_{C_p}$ through the chopper capacitor 22, the currents $i31_1$, $i31_2$, $i31_n$ through the windings $31_1$, $31_2$, $31_n$, and the currents $i41_1$, $i41_2$ through the tap capacitors $41_1$, $41_2$, have a sinusoidal waveform with a frequency equal the switching frequency f2 of the chopper circuit 2. That is, the power converter circuit operates in the resonant mode if each of the currents mentioned above can be expressed as $$i_x(t) = b \cdot e_x(t) \cdot \sin(2\pi \cdot f2 \cdot t) \quad (8),$$

where $i_x(t)$ denotes any of the currents explained above, $e_x$ is a timely varying envelope of the respective current $i_x(t)$, f2 is the switching frequency of the chopper circuit, and b is a (constant) proportionality factor. In the power converter circuit shown in FIG. 10, for example, the envelopes $e_x(t)$ of the individual currents in the individual sub-periods are given as shown in Table 1 below. Table 1 shows the envelopes $e_x(t)$ of the currents given in the left column in the three sub-periods $0 < t < t_0$, $t_0 < t < t_1$, and $t_1 < t < t_2$.

TABLE 1

| $e_x(t)$ | $0 < t < t_0$ | $t_0 < t < t_1$ | $t_1 < t < t_2$ |
|---|---|---|---|
| $i41_1$ | $d^*$ | $2 - d^*$ | $0$ |
| $i41_2$ | $0$ | $d^* - 1$ | $3 - d^*$ |
| $i_{C_p} = i31_n$ | $\dfrac{d^*}{3}$ | $\dfrac{d^*}{3}$ | $2 \cdot \dfrac{3-d^*}{3}$ |
| $i31_2$ | $\dfrac{d^*}{3}$ | $\dfrac{3-2d^*}{3}$ | $\dfrac{d^*-3}{3}$ |
| $i31_1$ | $\dfrac{-2d^*}{3}$ | $\dfrac{d^*-3}{3}$ | $\dfrac{d^*-3}{3}$ |

In Table 1, $i31_1$, $i31_2$, $i31_n$ denote the currents through the respective windings of the autotransformer 31, and $d^*$ is given by $$d^* = \frac{3v_{OUT}}{V_{IN0}}. \quad (9)$$

As mentioned above, the leakage inductances $33_1$, $33_2$, $33_n$ can be obtained by measuring and/or simulating certain parameters of the autotransformer 31 before assembling the power converter circuit. As will be explained below, the inductances $33_1$, $33_2$, $33_n$ shown in FIG. 10 can be obtained from leakage inductances of the autotransformer 31 between taps of the autotransformer. These taps include taps $32_1$ and $32_2$ explained above. For the purpose of explanation, a first input node where the autotransformer 31 is connected to the output of the chopper circuit 2 is referred to as tap $32_n$ and a second input node where the autotransformer 31 is connected to the reference node 12 is referred to as tap $32_0$ in the following.

Figures 15A, 15B:
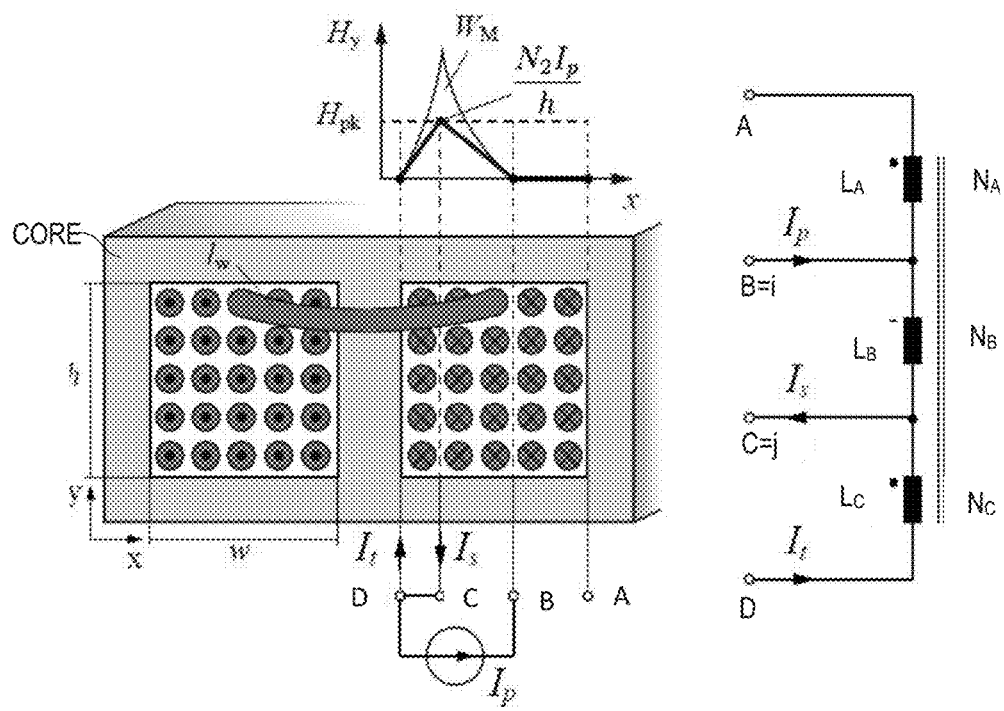
FIGS. 15A and 15B illustrate one method for determining parasitic inductances of an autotransformer.
Figures 16A, 16B, 16C:
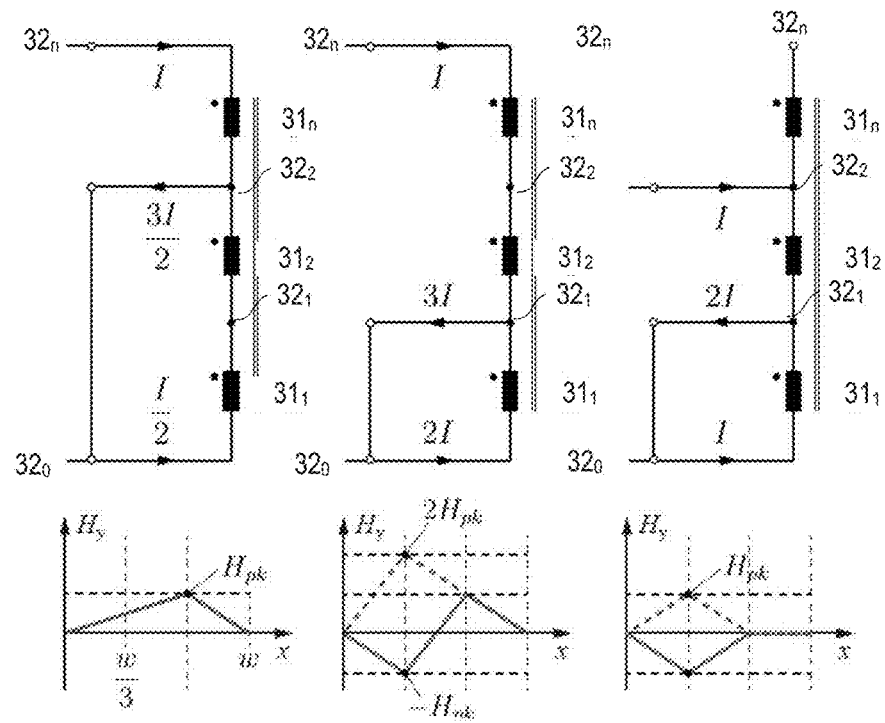
FIGS. 16A-16C illustrate how the method shown in FIG. 15 may be applied to the autotransformer shown in FIG. 10.

FIG. 15A schematically illustrates an autotransformer with n=3 windings $L_A$, $L_B$, and $L_C$ wound around the same core and with four taps A, B, C, D, where A and D are the input nodes of the autotransformer and B and C are taps between $L_A$ and $L_B$ and between $L_B$ and $L_C$, respectively. FIG. 15B shows an equivalent circuit diagram of the autotransformer shown in FIG. 15A. In this autotransformer shown in FIG. 15A, an average length of one turn of each winding is $l_w$, a width of a winding window of the core is w, and a height of the winding window is h. In the following, based on FIGS. 15A and 15B, it is explained how the leakage inductance between two taps of the autotransformer may be calculated based on a model of the autotransformer. With reference to FIGS. 16A to 16C it is then explained how the leakage inductances of the autotransformer 31 shown in FIG. 10 can be calculated.

In the following $L_{s(i,j)}$ denotes a leakage inductance between two taps i and j of an autotransformer. For the purpose of explanation, it is assumed that these taps are taps B and C of the autotransformer shown in FIGS. 15A and 15B. Referring to FIG. 15A, determining the leakage inductance $L_{s(i,j)}$ includes calculating the leakage inductance $L_{s(i,j)}$ based on the assumption that a current $I_p$ is driven into tap i and winding $L_C$ is short-circuited, that is, short tap C=j and tap D are short-circuited. A current $I_p$ driven into tap B generates a magnetic field $H_y$. This magnetic field $H_y$ and the magnetic energy $W_M$ associated therewith is schematically illustrated in the graph drawn above the autotransformer shown in FIG. 15A. The magnetic energy stored in the autotransformer when operating the autotransformer in a configuration as shown in FIGS. 15A and 15B and when a current level of the current $I_p$ is given by I can be calculated as:

$$W_{M(i,j)} = \frac{1}{2}L_{s(i,j)}I^2 = \quad (10)$$

$$\mu_0 \frac{l_w h}{2} \int_0^w H_y^2(x)\,dx = \mu_0 \frac{l_w h}{2}\left[\int_0^{\frac{N_C}{N_{tot}}w}\left(\frac{1}{h}N_C\frac{N_B}{N_C}I\frac{x}{\frac{N_C}{N_{tot}}w}\right)^2 + \right.$$

$$\left.\int_{\frac{N_C}{N_{tot}}w}^{\frac{N_B+N_C}{N_{tot}}w}\left(-\frac{1}{h}N_2 I\frac{x - \frac{N_B+N_C}{N_{tot}}w}{\frac{N_B}{N_{tot}}w}\right)^2\right] = \frac{1}{2}\frac{\mu_0 l_w w}{h}$$

$$\left(\frac{N_{tot}}{3}\right)^2 I^2 \frac{3(N_B+N_C)N_B^2}{N_{tot}^3} \approx \frac{1}{2}L_0 I^2 \frac{3(N_B+N_C)N_B^2}{N_{tot}^3}$$

where $$L_0 \approx \frac{\mu_0 l_w w}{h}\left(\frac{N_{tot}}{3}\right)^2, \quad (11)$$

and wherein $N_B$ denotes the number of turns of winding $L_B$, $N_C$ denotes the number of turns of winding $L_C$, $N_D$ denotes the number of turns of winding $L_D$, and $N_{tot}$ denotes the overall number of turns, which is $N_{tot}=N_A+N_B+N_C$. Based on equations (9) and (10), the leakage inductance $L_{s(2,1)}$ can be expressed as $$L_{s(i,j)} = L_{s(B,C)} = L_0 \frac{3(N_B+N_C)N_B^2}{N_{tot}^3} \quad (12)$$

Thus, the leakage inductance $L_{s(B,C)}$ between two taps B, C of an autotransformer can be calculated based on the geometry of the transformer, which is included in $L_0$, based on the number of turns $N_B$ that are located between the taps B and C, the number of turns $N_C$ that are short-circuited, and the overall number of turns $N_{tot}$.

In the following, $L_s$ denotes the plurality of leakage inductances of the autotransformer 31 shown in FIG. 10. In this transformer 31, taps $32_n$, $32_2$, $32_1$, $32_0$ may briefly be referred to as taps n, 2, 1, and 0, respectively. Thus, for example, $L_{s(2,1)}$ denotes the leakage inductance between taps $32_2$ and $32_1$ of the autotransformer shown in FIG. 10. The plurality of leakage inductances includes a leakage inductance $L_{s(n,2)}$ between taps n and 2, a leakage inductance $L_{s(n,1)}$ between taps n and 1, and a leakage inductance $L_{s(2,1)}$ between taps 2 and 1. $L_s$ is therefore given as:

$$L_s = [L_{s(n,2)} L_{s(n,1)} L_{s(2,1)}]^T \approx \Lambda^T L_0 \quad (13)$$

FIGS. 16A, 16B and 16C illustrate the set-up for calculating the leakage inductances $L_{s(n,2)}$, $L_{s(n,1)}$, and $L_{s(2,1)}$, respectively, in the autotransformer 31 shown in FIG. 10. Calculating the leakage inductance $L_{s(n,2)}$, for example, includes referring to FIG. 16A driving a current I into tap n and short circuiting windings $31_2$ and $31_1$. Comparing FIGS. 15B and 16A it can be seen that the number $N_B$ of turns between the taps where the leakage inductance is to be determined equals $N_n$ in FIG. 16A, and the number of turns $N_C$ that are short-circuited equals $N_2+N_1$ in FIG. 16A. Inserting $N_B=N_n$ and $N_C=N_1+N_2$ in equation (11) and assuming that the individual windings $31_1$, $31_2$, $31_n$ have the same number of turns, so that $N_1=N_2=N_n=\frac{1}{3}N_{tot}$, it can be shown that $$L_{s(n,2)} = \frac{1}{3} \cdot L_0 \quad (14),$$

where $L_0$ includes parameters of the transformer geometry and the overall number of turns, as explained with equation (10). Based on equation (12) and on what is shown in FIGS. 16B and 16C it can be shown that $\Lambda$ is given as follows, if the individual windings $31_1$, $31_2$, $31_n$ have the same number of turns, so that $N_1=N_2=N_n=\frac{1}{3}N_{tot}$, $$\Lambda = \begin{bmatrix} \frac{1}{3} & \frac{4}{3} & \frac{2}{9} \end{bmatrix} \quad (15a)$$

Equation (10) and, therefore equation (12) from which equation (15a) had been derived, is based on the assumption that the windings of the autotransformer are connected in the same order as shown in FIGS. 10 and 16A to 16C, so that there is no interleaving in the winding arrangement. The curves drawn in dashed lines in the graphs shown in FIGS. 16A to 16C illustrate the magnetic field in the transformer in this case.

If the winding arrangement is modified, for example by interleaving the three windings $31_n$, $31_2$, $31_1$, which may reduce the magnetic energy and, therefore, result in a more efficient magnetic design, equation (10) is not valid anymore. For example, swapping the windings associated to $31_2$ and $31_1$ and repeating the procedure explained with reference to FIGS. 15 and 16A to 16C results in a magnetic field that is represented by the solid lines in the graphs shown in FIGS. 16A to 16C. As can be seen from FIG. 16B, for example, the magnetic field is reduced to 50%. In this case, $\Lambda$ is $$\Lambda = \begin{bmatrix} \frac{1}{3} & \frac{1}{3} & \frac{2}{9} \end{bmatrix}. \quad (15b)$$

The inductances gathered in Ls do not have a direct correspondence in the autotransformer equivalent circuit shown in FIGS. 10 and 15. That is, inductances $L_{s(n,2)}$, $L_{s(n,1)}$, $L_{s(2,1)}$ are not the inductances $33_n$, $33_2$, $33_1$ shown in FIG. 10. These inductances $33_n$, $33_2$, $33_1$ are also referred to as $L_{on}$, $L_{o2}$, $L_{o1}$ in the following. One way of how $L_{on}$, $L_{o2}$, $L_{\sigma 1}$ may be calculated based on Ls is explained below. For the purpose of explaining this calculation a compact notation is introduced as follows:

$$W_M = [W_{M(n,2)} W_{M(n,1)} W_{M(2,1)}]^T \qquad (16)$$

$$W_E = [W_{E(n,2)} W_{E(n,1)} W_{E(2,1)}]^T \qquad (17)$$

$$L_\sigma = [L_{\sigma n} L_{\sigma 2} L_{\sigma 1}]^T \qquad (18)$$

$$C_\sigma^{-1} = \left[ \frac{1}{C_p} \; \frac{1}{C_{tap,2}} \; \frac{1}{C_{tap,1}} \right] \qquad (19)$$

where $W_{E(i,j)}$ denotes the electrical energy and $W_{M(i,j)}$ denotes the magnetic energy stored in the autotransformer when measuring $L_{s(i,j)}$ as explained above. Furthermore, $C_p$ is the capacitance of the chopper capacitor 22, $C_{tap,2}$ is the capacitance of the second tap capacitor $41_2$, and $C_{tap,1}$ is the capacitance of the first tap capacitor $41_1$.

Considering the current ratios shown in FIGS. 16A-C, the magnetic energy $W_M$ stored in the autotransformer in each experiment is $$W_M = \frac{1}{2} L_s I^2 = \frac{1}{2} M L_\sigma I^2 \qquad (20)$$

so that $$L_\sigma = M^{-1} \Lambda^T L_0 \qquad (21)$$

where $$M = \begin{bmatrix} 1 & \left(\frac{3}{2}\right)^2 & 0 \\ 1 & 0 & 3^2 \\ 0 & 1 & 2^2 \end{bmatrix} \qquad (22)$$

Consequently, the capacitors $C_\sigma^{-1}$ can be calculated as follows in order to tune the frequency of the currents in each sub-period to f2:

$$C_\sigma^{-1} = (2 \cdot \pi \cdot f2)^2 M^{-1} \Lambda^T L_0 \qquad (23).$$

Thus, based on parameters of the autotransformer and in consideration of a desired switching frequency f2 of the chopper circuit 2 the capacitances of the chopper capacitor 22, and the tap capacitors $41_1$, $41_2$ can be suitably selected in order to obtain sinusoidal current waveforms, that is, in order to operate the power converter circuit, in particular the chopper circuit 2 and the rectifier circuit 4 in a resonant fashion. The parameters of the transformer, such as the leakage inductances may be calculated as explained above, measured and/or simulated before employing the autotransformer in the power converter circuit. Alternatively, these parameters may be obtained from a data sheet provided by the supplier of the autotransformer.

It should be noted that the topology shown in FIG. 10 is only one of a plurality of suitable power converter topologies. Examples of some other topologies are explained with reference to FIGS. 17 to 20 herein below.

Figure 17:
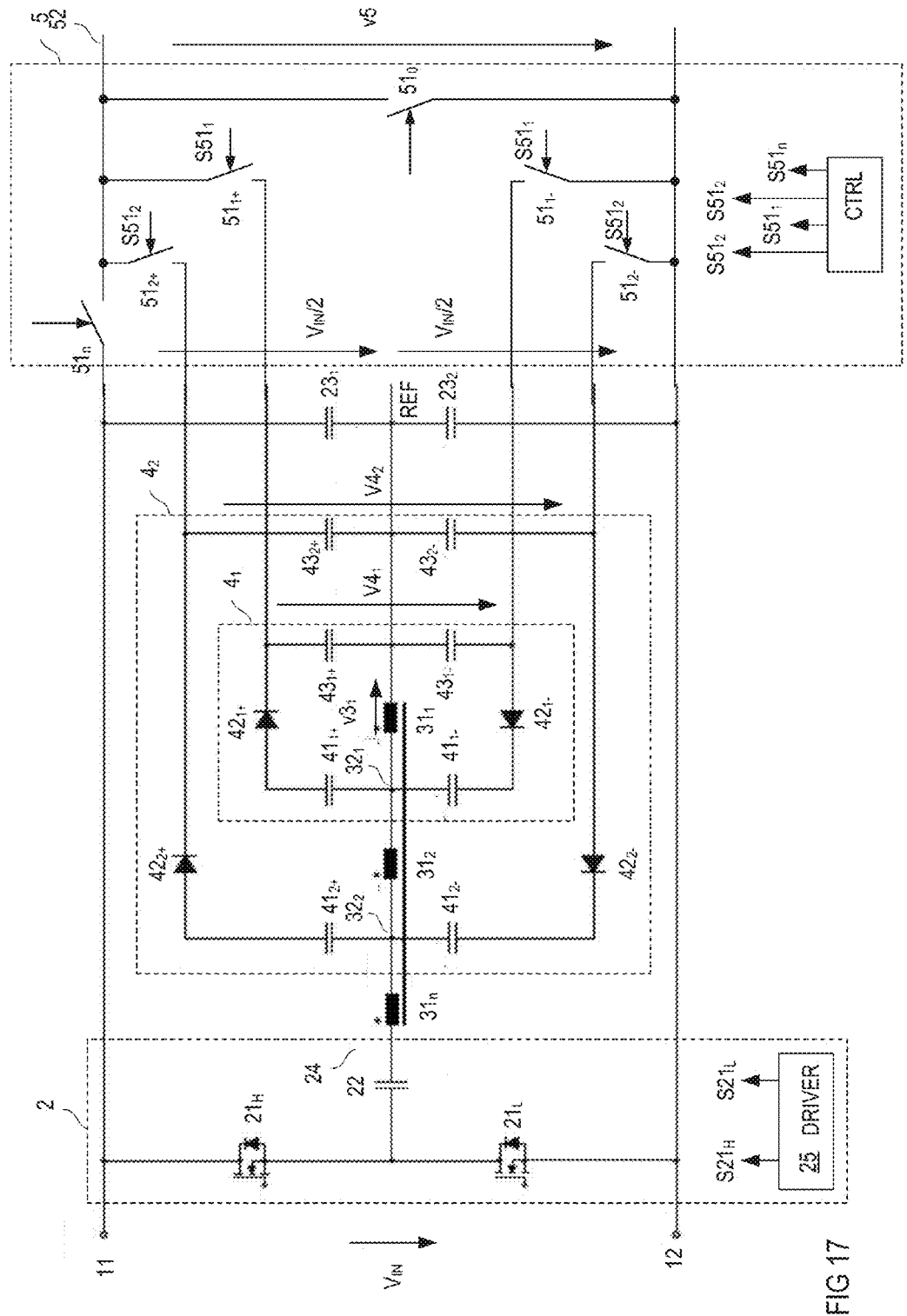
FIG. 17 show a rectifier circuit and a selector circuit according to another example.

FIG. 17 shows a chopper circuit 2, a rectifier circuit 4 and a selector circuit 5 of a power converter circuit according to another example. In this example, the chopper circuit 2 has the same topology as explained with reference to FIGS. 4 and 10 herein before. The autotransformer 31 has the same topology as the autotransformer 31 explained before, but is connected between the output of the chopper circuit 2 and a reference node REF that is different from the second output node. This reference node REF is formed by a tap of a capacitive voltage divider with a first capacitor $23_1$ and a second capacitor $23_2$ wherein this capacitive voltage divider $23_1$, $23_2$ is connected between the first input node 11 and the second input node 12. According to example, voltage divider capacitors have the same capacitance so that the voltage at the reference node REF is $V_{IN}/2$ as referenced to the second input node 12. The chopper voltage v2 is the voltage between the output 24 of the chopper circuit 2 and the reference node REF. This chopper voltage again is a zero-mean square wave voltage with a frequency of f2.

The rectifier stages $4_1$, $4_2$ are different from the rectifier stages $4_1$, $4_2$ shown in FIG. 10 in that each rectifier stage $4_1$, $4_2$ includes two output capacitors $43_{1+}$, $43_{1-}$, and $43_{2+}$, $43_{2-}$, respectively, wherein one circuit node of each of these capacitors is connected to the reference node REF. One way of operation of these rectifier circuits $4_1$, $4_2$ is explained with reference to the rectifier stage $4_1$ in the following. The rectifier stage $4_2$ operates equivalently.

The output capacitors $43_{1+}$, $43_{1-}$ of rectifier stage $4_1$ are charged based on the tap voltage $v3_1$ at the first tap $32_1$. In this rectifier stage $4_1$, output capacitor $43_{1+}$ is charged each time the tap voltage $v3_1$ has a first polarity, and output capacitor $43_{1-}$ is charged each time the tap voltage $v3_1$ has a second polarity opposite the first polarity. The first output capacitor $43_{1+}$ is connected in series with the first rectifier element $42_{1+}$ and a first capacitor $41_{1+}$, whereas this series circuit is connected in parallel with the first winding $31_1$. The second output capacitor $43_{1+}$ is connected in series with the second rectifier element $42_{1-}$ and a second capacitor $41_{1-}$ whereas this series circuit is also connected in parallel with the first winding $31_1$. The first DC link voltage $V4_1$ is available across a series circuit of the two output capacitors $43_{1+}$, $43_{1-}$. In this rectifier stage $4_1$, each of the output capacitors $43_{1+}$, $43_{1-}$ is charged to a voltage level that equals the amplitude of the tap voltage $v3_1$ so that the DC link voltage $V4_1$ equals twice the amplitude of the tap voltage $v3_1$, which is the same as in the power converter circuit shown in FIG. 10. The first and second capacitors $41_{1+}$, $41_{1-}$ are equivalent to the tap capacitor $41_1$ shown in FIG. 10 but do not serve to boost the DC link voltage in this example. Like tap capacitor $41_1$ these tap capacitors $41_{1+}$, $41_{1-}$ are part of series resonant circuits, where inductors of these series resonant circuits are formed by leakage inductances of the autotransformer 31. However, these leakage inductances, which are the same as shown in FIG. 10, are not shown in FIG. 17.

Equivalently to the first rectifier stage $4_1$, the second rectifier stage $4_2$ includes a series circuit with a first output capacitor $43_{2+}$, a first rectifier element $42_{2+}$ and a first capacitor $41_{2+}$, wherein this series circuit is connected in parallel with a series circuit that includes the first winding $31_1$ and the second winding $31_2$. Furthermore, the second rectifier stage $4_2$ includes a series circuit with the second output capacitor $43_{2-}$, a second rectifier element $42_{2-}$ and the second capacitor $41_{2-}$. The second DC link voltage $V4_2$ is available across a series circuit of the output capacitor $43_{2+}$, $43_{2-}$.

In the power converter circuit shown in FIG. 17, the selector circuit 5 includes two switches connected to each rectifier stage $4_1$, $4_2$ instead of only one switch, as in the example shown in FIG. 10. For connecting the first DC link voltage $V4_1$ to the output 52, for example, the power converter circuit shown in FIG. 17 includes switches $51_{1+}$, $51_{1-}$. From these switches, switch $51_{1+}$ connects the series circuit with the output capacitors $43_{1+}$, $43_{1-}$ to the output 52 and switch $51_{1-}$ connects the series circuit with the output capacitors $43_{1+}$, $43_{1-}$ to the second input node 12. Equivalently, the power converter circuit includes switches $51_{2+}$, $51_{2-}$ for connecting the series circuit with the output capacitors $43_{2+}$, $43_{2-}$ between the output 52 and the second input node 12. Switches $51_{1+}$, $51_{1-}$ are operated simultaneously by a drive signals $S51_1$, and switches $51_{2+}$, $51_{2-}$ are operated simultaneously by a drive signal $S51_2$. Like in the power converter circuit shown in FIG. 10, the capacitances of the tap capacitors $41_{1+}$-$41_{2-}$ can be designed such that, in consideration of the chopper frequency f2 and the leakage inductances of the autotransformer 31, the chopper circuit 2 and the rectifier circuit operate in a resonant mode.

Figure 18:
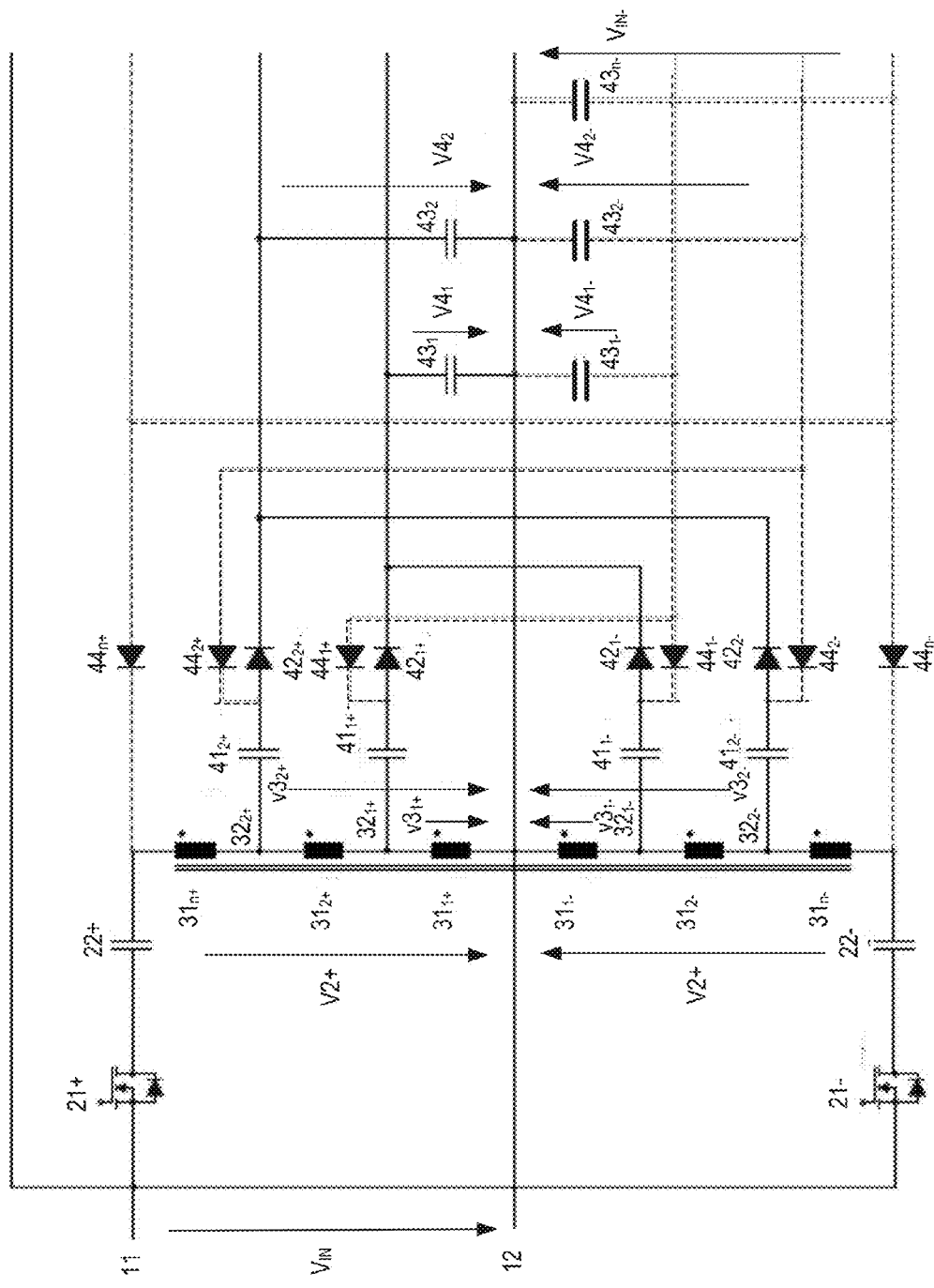
FIG. 18 show a chopper circuit, an autotransformer circuit and a rectifier circuit according to another example.

FIG. 18 shows a chopper circuit 2, an autotransformer circuit 3 and a rectifier circuit 4 according to another example. In this example, the autotransformer circuit 3 includes 2n windings $31_{n+}$, $31_{2+}$, $31_{1+}$, $31_{1-}$, $31_{2-}$, $31_{n-}$ connected in series. A first subset of these windings is connected in series with the first switch 21+ and the first chopper capacitor 22+ and the series circuit is connected between the first input node 11 and the second input node 12, and a second subset of these windings is connected in series with the second switch 21− and the second chopper capacitor 22− and the series circuit is connected between the first input node 11 and the second input 12. The first subset $31_{n+}$, $31_{2+}$, $31_{1+}$ includes a first tap $32_{1+}$ and a second tap $32_{2+}$ and provides a first tap voltage $v3_{1+}$, $v3_{2+}$ at each of these taps $32_{1+}$, $32_{2+}$, wherein the tap voltages $v3_{2+}$, $v3_{1+}$ are referenced to the second input node 12. Equivalently, the second subset $31_{n-}$, $31_{2-}$, $31_{1-}$ of the windings includes a first tap $32_{1-}$, $32_{2-}$ and generates a tap voltage $v3_{2-}$, $v3_{1-}$ at each of these taps $32_{2-}$, $32_{1-}$, wherein each of these tap voltages $v3_{2-}$, $v3_{1-}$ is referenced to the second input node 12.

The switches 21+, 21− of the chopper circuit 2 are operated in the same way as the high-side switch $21_H$ and the low-side switch $21_L$ explained herein before. That is, these switches are switched on and off in an alternating fashion at a switching frequency f2, wherein each switch 21+, 21− is switched on 50% of one switching period T2. The tap voltages $v3_{1+}$, $v3_{2+}$ are different from zero each time the first switch 21+ is switched on, and the tap voltages $v3_{1-}$, $v3_{2-}$ of the second subset are different from zero each time the second switch 21− is switched on. According to one example, the windings $31_{n+}$-$31_{n-}$ have the same number of turns. In the example shown in FIG. 18, maximum levels of the individual tap voltages are then given as follows:

$$v3_{1+\_max} = v3_{1-\_max} = \tfrac{1}{3} \cdot V_{IN} \quad (24a)$$

$$v3_{2+\_max} = v3_{2-\_max} = \tfrac{2}{3} \cdot V_{IN} \quad (24b)$$

Referring to FIG. 18, a first output capacitor $43_1$ across which the first DC link voltage $V4_1$ is available is coupled to the first tap $32_{1+}$, $32_{1-}$ of each subset, and a second output capacitor $43_2$ across which the second DC link voltage $V4_2$ is available is coupled to the second tap $32_{2+}$, $32_{2-}$ of each subset. In particular, the first output capacitor $43_1$ is coupled to the first tap $32_{1+}$ of the first subset via a tap capacitor $41_{1+}$ and a rectifier element $42_{1+}$ and to the first tap $32_{1-}$ of the second subset via a capacitor $41_{1-}$ and a rectifier element $42_{1-}$. The second output capacitor $43_2$ is coupled to the second tap $32_{2+}$ of the first subset via a tap capacitor $41_{2+}$ and a rectifier element $42_{2+}$ and to the second tap $32_{2-}$ of the second subset via a tap capacitor $41_{2-}$ and the rectifier element $42_{2-}$. The first DC link voltage $V4_1$ equals one third of the input voltage $V_{IN}$, and the second DC link voltage $V4_2$ equals ⅔ of the input voltage $V_{IN}$ in this example.

The dashed lines in FIG. 18 illustrate a modification of the rectifier circuit. In this example, a negative equivalent of each DC link voltage $V4_1$, $V4_2$ is generated. These negative equivalents are referred to as $V4_{1-}$ and $V4_{2-}$ in FIG. 18. Each of these further DC link voltages $V4_{1-}$, $V4_{2-}$ is available across a respective capacitor $43_{1-}$, $43_{2-}$. Capacitor $43_{1-}$ is coupled to the first tap $32_{1+}$ and $32_{1-}$ of each subset, and capacitor $43_{2-}$ is coupled to the second tap $32_{2+}$, $32_{1-}$ of each subset of windings. For this, capacitor $43_{1-}$ is coupled to capacitor $41_{1+}$ via a rectifier element $44_{1+}$ and to capacitor $41_{1-}$ via rectifier element $44_{1-}$. Furthermore, output capacitor $43_{2-}$ is coupled to capacitor $41_{2+}$ via rectifier element $44_{2+}$ and to capacitor $41_{2-}$ via a rectifier element $44_{2-}$. The input voltage $V_{IN}$ is available at the first input node 11 in this example. A negative equivalent $V_{IN-}$ of the input voltage $V_{IN}$ is available across another capacitor $43_{n-}$ connected between the second input node 12 and the second chopper capacitor 22−, whereas capacitor $43_{n-}$ is connected to chopper capacitor 22− via another rectifier element $44_n$. In the modification shown in FIG. 18 positive and negative DC link voltages are available, so that a selector circuit 5 (not shown in FIG. 18) can synthesize an output voltage having positive or negative levels. For example, the selector circuit can synthesize a sinusoidal output voltage without requiring an unfolding bridge in the output filter. Like in the power converter circuit shown in FIG. 10, the capacitances of the tap capacitors $41_{1+}$-$41_{2-}$ can be designed such that, in consideration of the chopper frequency f2 and the leakage inductances of the autotransformer 31, the chopper circuit 2 and the rectifier circuit operate in a resonant mode.

Figure 19:
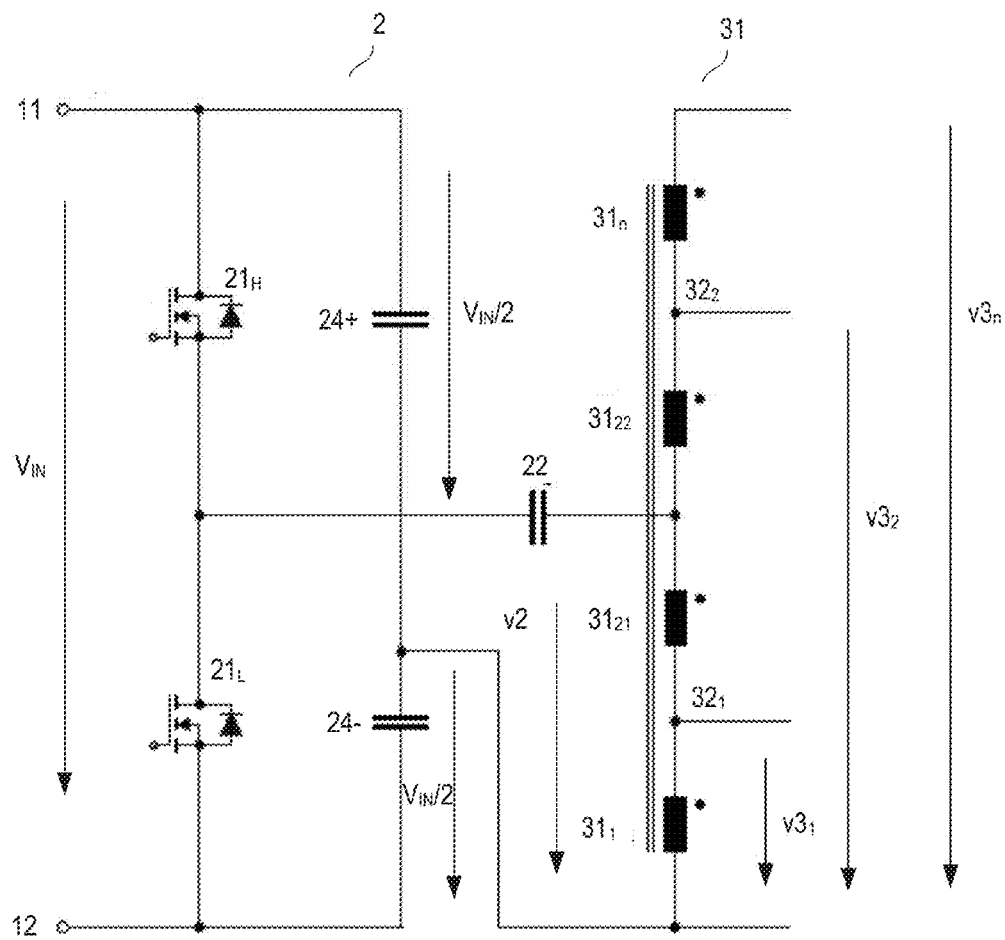
FIG. 19 show a chopper circuit and an autotransformer circuit according to another example.

FIG. 19 shows a chopper circuit 2 and an autotransformer circuit 3 according to another example. In this example, the autotransformer circuit 3 is connected between a tap of the half-bridge $21_H$, $21_L$ and a tap of a capacitive voltage divider. The capacitive voltage divider includes two capacitors 24+, 24−, which, according to one example, have the same capacitance. A voltage at the tap of the capacitive voltage divider therefore is $V_{IN}/2$ relative to the second input node 12. In this example, the autotransformer circuit 3 includes four windings $31_n$, $31_{22}$, $31_1$, $31_1$, wherein the chopper voltage v2 is applied to the series circuit with the windings $31_{21}$, $31_1$. A first tap voltage $V3_1$ is available across winding $31_2$. A second tap voltage $V3_2$ is available across the series circuit with the windings $31_1$, $31_{21}$, $31_{22}$, and a third tap voltage $v3_n$ is available across the overall series circuit with the windings $31_n$, $31_{22}$, $31_{21}$, $31_1$. In this example, tap voltages $v3_2$, $v3_n$ are again proportional to the chopper voltage v2 but have a higher amplitude than the chopper voltage v2. According to one example, windings $31_1$ and $31_n$ have the same number of turns and each of windings $31_{21}$, $31_{22}$ have a number of turns that equals half the number of turns of each of windings $31_1$, $31_n$. In this case, the first tap voltage $v3_1$ is ⅔ of the input voltage $V_{IN}$, the second tap voltage $v3_2$ is 4/6 of the input voltage $V_{IN}$ and the third tap voltage $v3_1$, is the input voltage $V_{IN}$.

Figure 20:
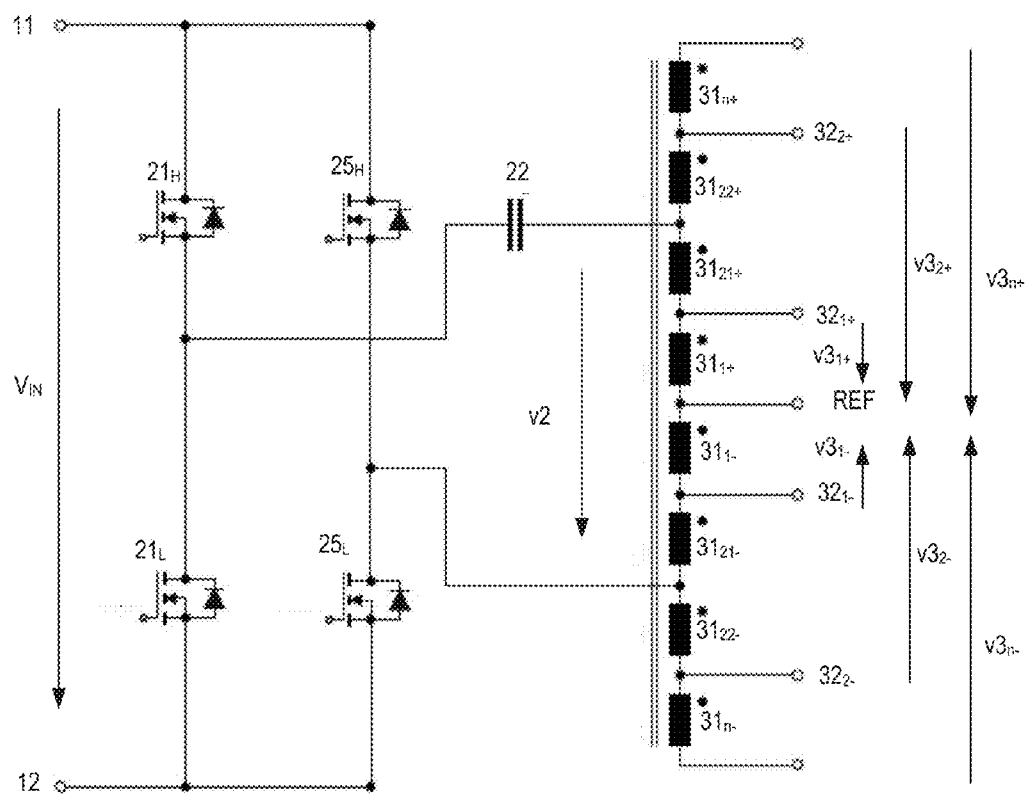
FIG. 20 show a chopper circuit and an autotransformer circuit according to yet another example.
Figure 21:
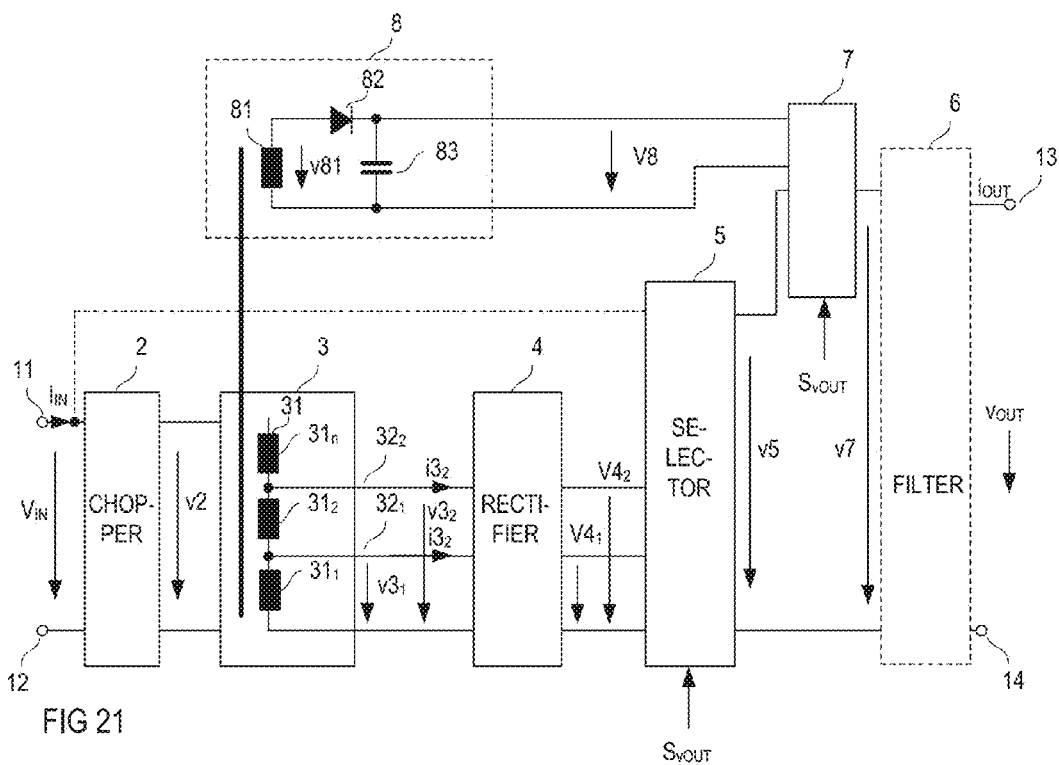
FIG. 21 shows a power converter circuit according to another example.

FIG. 20 shows a modification of the chopper circuit 2 and the autotransformer 31 shown in FIG. 19. In the example shown in FIG. 20, the chopper circuit includes two half-bridges, the half-bridge $21_H$, $21_L$ explained before (referred to as first half-bridge in the following) and another half-bridge $25_H$, $25_L$ (referred to as second half-bridge in the following). Both half-bridges are connected between the input nodes 11, 12 to receive the input voltage $V_{IN}$. An output (tap) of the first half-bridge $21_H$, $21_L$ is connected to one tap of the autotransformer 31, and an output (tap) of half-bridge $21_H$, $21_L$ is connected to another tap of the autotransformer 31. The autotransformer 31 includes a first and a second winding arrangement, wherein each of these winding arrangements is of the type shown in FIG. 19. In FIGS. 19 and 20 like features of the winding arrangements have the same reference characters, wherein in FIG. 20, like features of the two winding arrangements include the same reference character accompanied by a "+" in case of the first winding arrangement and a "−" in case of the second winding arrangement The first winding arrangement includes windings $31_{n+}$, $31_{22+}$, $31_{21+}$ and $31_{1+}$ and the second winding arrangement includes windings $31_{n-}$, $31_{22-}$, $31_{21-}$ and $31_{1-}$. The windings of both winding arrangements are connected in series and inductively coupled. Furthermore, the winding two arrangements are symmetrical relative to a reference node REF, whereas tap voltages $v3_{n+}$, $v3_{2+}$, $v3_{1+}$, $v3_{n-}$, $v3_{2-}$, $v3_{1-}$ of the autotransformer 31 are referenced to the reference node REF. The first half-bridge $21_H$, $21_L$ is connected to the tap between windings $31_{22+}$, $31_{21+}$ of the first winding arrangement via chopper capacitor 22, and the second half-bridge $24_H$, $24_L$ is connected to the corresponding tap, that is, the tap between windings $31_{22-}$, $31_{21-}$ of the second winding arrangement. The first winding arrangement may be implemented in the same way as the autotransformer shown in FIG. 19, so that tap voltages $v3_{n+}$, $v3_{2+}$, $v3_{1+}$ correspond to the tap voltages $v3_n$, $v3_2$, $v3_1$ explained with reference to FIG. 19. The second winding arrangement may be implemented in the same way as the first winding arrangement so that waveforms of its tap voltages $v3_{n-}$, $v3_{2-}$, $v3_{1-}$ correspond to waveforms of the tap voltages of the first winding arrangement. Unlike the arrangement shown in FIG. 19 the arrangement shown in FIG. 20 supplies tap voltages of both polarities. The chopper circuit operates at the switching frequency f2 explained above, FIG. 21 shows a power converter circuit according to another example. This power converter circuit is different from the power converter circuit shown in FIG. 1 in that it additionally includes a voltage regulator 7 that receives the selector output voltage v5 and generates a voltage regulator output voltage v7 based on the selector output voltage v5. Referring to the explanation below, the voltage regulator 7, which may also be referred to a series voltage regulator (SVR), is configured to add a voltage to the selector output voltage v5 so that the regulator output voltage v7 equals the selector output voltage v5 (if the added voltage is zero) or is higher the selector output voltage v5. One way of operation of the selector circuit 5 shown in FIG. 21 and the voltage regulator 7 is explained with reference to FIG. 22 below.

Figure 22:
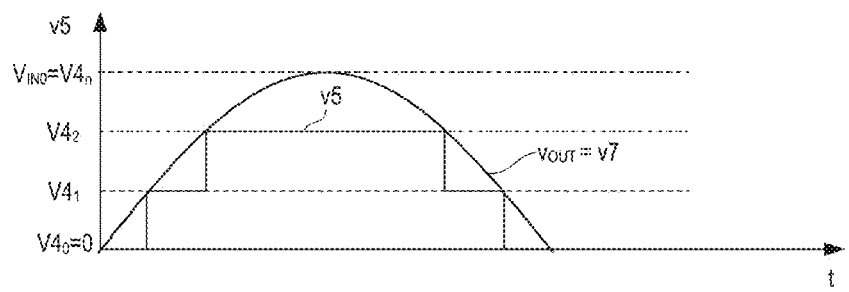
FIG. 22 shows timing diagrams of a selector output voltage and a power converter output voltage of the power converter circuit shown in FIG. 21.

FIG. 22 shows timing diagrams of the selector output voltage v5 and the power converter output voltage $v_{OUT}$ during one half cycle (one cycle) of a sinusoidal output voltage (a rectified sinusoidal output voltage). Referring to FIG. 22, the selector 5 is configured to generate the selector output voltage v5 such that a voltage level of the selector output voltage v5 is below the desired voltage level of the output voltage $v_{OUT}$. The voltage level of the output voltage $v_{OUT}$ can be defined by an external load, such as a power grid, or can be defined by some other signal received by the selector circuit 5 and the voltage regulator 7. Just for the purpose of explanation it is assumed that the voltage level of the output voltage $v_{OUT}$ is defined by an external load. In this example, the selector circuit 5 receives the output voltage $v_{OUT}$ and, based on the instantaneous voltage level of the output $v_{OUT}$, generates the selector output voltage v5 based on the voltage levels 0, $V4_1$, $V4_2$, $V_{IN}$ it receives. In particular, the selector circuit 5, at each time, is configured to select one of the plurality of voltage levels such that the selected voltage level is equal to or below the instantaneous voltage level of the output voltage your. In FIG. 22 $S_{vOUT}$ is a signal that represents the output voltage $v_{OUT}$. This signal is received by the selector circuit 5 and the voltage regulator 7 in the example shown in FIG. 21.

The voltage regulator 7 is configured to internally generate a voltage that corresponds to a difference between the instantaneous voltage level of the output voltage $v_{OUT}$ and the voltage level of the selector output voltage v5 and to add this internally generated voltage to the selector output voltage v5 so that the voltage regulator output voltage v7 is the output voltage $v_{OUT}$. The filter circuit 6 is optional. As the selector output voltage v5 does not switch between different voltage levels at a relatively high switching frequency (f4 in the examples explained herein before) a low-pass filter in the filter circuit 6 is not required. Thus, the filter circuit 6 may only include an unfolding bridge according to one example. In this case, the filter circuit 6 may only change the polarity of the voltage regulator output voltage v7 in order to generate the output voltage $v_{OUT}$ if, for example, the output voltage $v_{OUT}$ is a sinusoidal voltage and the voltage regulator output voltage v7 is a rectified sinusoidal voltage.

For generating the voltage that is added to the selector output voltage v5 the selector circuit receives a supply voltage from an auxiliary voltage source 8. This auxiliary voltage source may include an auxiliary winding 81 of the autotransformer 31. This auxiliary winding 81 is inductively coupled with the autotransformer windings $31_1$, $31_2$, $31_n$ explained before, but not connected in series with these windings $31_1$, $31_2$, $31_n$ Instead, the auxiliary winding is coupled to a rectifier 82, 83 that generates the supply voltage V8 from a voltage v81 across the auxiliary winding. The voltage v81 across the auxiliary winding, like the tap voltages, is an alternating voltage with a frequency defines by the chopper frequency f2. The rectifier circuit 82, 83 generates a DC voltage, which forms the supply voltage V8, from this alternating voltage. The rectifier circuit may include a series circuit with a rectifier element 82, such as a diode, and a capacitor 83, whereas this series circuit is connected in parallel with the auxiliary winding 81 and the supply voltage V8 is available across the capacitor 83.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

Spatially relative terms such as "under," "below," "lower," "over," "upper" and the like, are used for ease of description to explain the positioning of one element relative to a second element. These terms are intended to encompass different orientations of the device in addition to different orientations than those depicted in the figures. Further, terms such as "first," "second" and the like, are also used to describe various elements, regions, sections, etc. and are also not intended to be limiting. Like terms refer to like elements throughout the description.

As used herein, the terms "having," "containing," "including," "comprising" and the like are open ended terms that indicate the presence of stated elements or features, but do not preclude additional elements or features. The articles "a," "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A power converter circuit, comprising:
   a chopper circuit configured to receive an input voltage and generate a chopper voltage with an alternating voltage level based on the input voltage;
   an autotransformer comprising at least one tap, wherein the autotransformer is coupled to the chopper circuit and configured to generate a tap voltage at the at least one tap; and
   a selector circuit configured to receive a plurality of voltage levels,
   wherein at least one of the voltage levels is based on the at least one tap voltage,
   wherein the selector circuit is further configured to generate a selector output voltage based on the plurality of voltage levels such that the selector circuit selects two of the plurality of voltage levels and switches at a switching frequency between the two voltage levels,
   wherein the chopper circuit is configured to generate the chopper voltage at a chopper frequency, and
   wherein the chopper circuit further comprises at least one series resonant circuit excited by the chopper voltage, wherein parameters of the at least one series resonant circuit are adapted to the chopper frequency such that the chopper frequency substantially equals a resonant frequency of the at least one series resonant circuit.

2. The power converter circuit of claim 1, wherein the two voltage levels selected by the selector circuit are two consecutive voltage levels of the plurality of voltage levels.

3. The power converter circuit of claim 1, wherein the switching frequency of the selector circuit is fixed.

4. The power converter circuit of claim 1, wherein the chopper frequency is fixed.

5. The power converter circuit of claim 1, wherein the chopper circuit comprises a half-bridge operated at the chopper frequency.

6. The power converter circuit of claim 5, wherein the chopper circuit comprises a capacitor coupled between the half-bridge and the autotransformer.

7. The power converter circuit of claim 1, further comprising:
   a rectifier circuit configured to receive the at least one tap voltage and generate at least one of the voltage levels received by the selector circuit based on the at least one tap voltage.

8. The power converter circuit of claim 7, wherein the rectifier circuit comprises at least one tap capacitor coupled to the at least one tap.

9. The power converter circuit of claim 1, wherein the filter circuit comprises a low-pass filter.

10. The power converter circuit of claim 1, wherein the filter circuit comprises an unfolding bridge.

11. The power converter circuit of claim 1, wherein the at least one tap comprises a plurality of taps.

12. The power converter circuit of claim 1, wherein the switching frequency is selected from between several kilohertz and several megahertz.

13. The power converter circuit of claim 1, wherein the switching frequency is selected from between 10 kilohertz and 10 megahertz.

14. The power converter circuit of claim 1, further comprising a filter circuit configured to receive the selector output voltage and generate an output current based on the selector output voltage.

15. The power converter circuit of claim 14,
    wherein the filter circuit is configured to provide the output current at an output,
    wherein the filter circuit is configured to have a waveform of a voltage at the output defined by a load, and
    wherein the selector circuit is configured to select the two voltage levels of the plurality of voltage levels based on an instantaneous level of the voltage at the output of the filter circuit.

16. A power converter circuit, comprising:
    a chopper circuit configured to receive an input voltage and generate a chopper voltage with an alternating voltage level based on the input voltage and with a chopper frequency;
    an autotransformer comprising at least one tap, wherein the autotransformer is coupled to the chopper circuit and configured to generate a tap voltage at the at least one tap;
    a selector circuit configured to receive a plurality of voltage levels, wherein at least one of the voltage levels is based on the at least one tap voltage, and wherein the selector circuit is configured to generate a selector output voltage based on the plurality of voltage levels; and
    at least one series resonant circuit excited by the chopper voltage,
    wherein the at least one series resonant circuit includes a parasitic inductance of the autotransformer and wherein parameters of the at least one series resonant circuit are adapted to the chopper frequency such that the chopper frequency substantially equals a resonant frequency of the at least one series resonant circuit.

17. The power converter circuit of claim 16, wherein the chopper frequency is fixed.

18. The power converter circuit of claim 16,
    wherein the at least one tap comprises a plurality of taps, and
    wherein the at least one series resonant circuit comprises a plurality of series resonant circuits.

19. The power converter circuit of claim 16, wherein the parasitic inductance of the autotransformer is a leakage inductance.

20. The power converter circuit of claim 19, further comprising:
    a rectifier circuit configured to receive the at least one tap voltage and generate at least one of the voltage levels received by the selector circuit based on the at least one tap voltage.

21. The power converter circuit of claim 20,
    wherein the at least one tap comprises a plurality of taps,
    wherein the at least one series resonant circuit comprises a plurality of series resonant circuits,
    wherein the rectifier circuit comprises a plurality of rectifier stages, each rectifier stage being coupled to a respective one of the plurality of taps, wherein each of the plurality of rectifier stages comprises a tap capacitor coupled to the respective one of the taps, and wherein each of the plurality of series resonant circuits comprises the tap capacitor of a respective one of the plurality of rectifier stages.

22. The power converter circuit of claim 16, further comprising:

a voltage regulator coupled to an output of the selector circuit and configured to add a voltage to the selector output voltage.

23. A method, comprising:

receiving an input voltage and generating a chopper voltage with an alternating voltage level based on the input voltage and with a chopper frequency by a chopper circuit;

receiving the chopper voltage and generating at least one tap voltage based on the chopper voltage by an auto-transformer; and receiving a plurality of voltage levels by a selector circuit, wherein at least one of the voltage levels is based on the at least one tap voltage, and generating a selector output voltage based on the plurality of voltage levels by the selector circuit, wherein the chopper frequency substantially equals a resonant frequency of at least one series resonant circuit that includes a parasitic inductance of the auto-transformer.

* * * * *